US012661882B2

(12) United States Patent
Baba et al.

(10) Patent No.: US 12,661,882 B2
(45) Date of Patent: Jun. 23, 2026

(54) PRINTING APPARATUS, PRINTING METHOD, AND STORAGE MEDIUM

(71) Applicant: CANON KABUSHIKI KAISHA, Tokyo (JP)

(72) Inventors: Naoko Baba, Kanagawa (JP); Takayoshi Kikuchi, Kanagawa (JP); Yoshiyuki Honda, Kanagawa (JP); Daisuke Yoshitoku, Kanagawa (JP); Hiroshi Kawafuji, Tokyo (JP); Shunsuke Kakei, Kanagawa (JP); Akihiro Mouri, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 18/440,031

(22) Filed: Feb. 13, 2024

(65) Prior Publication Data

US 2024/0278556 A1 Aug. 22, 2024

(30) Foreign Application Priority Data

Feb. 22, 2023 (JP) ................................ 2023-026442

(51) Int. Cl.
*B41J 2/045* (2006.01)
*B41J 2/21* (2006.01)
*B41J 2/45* (2006.01)

(52) U.S. Cl.
CPC ....... *B41J 2/04573* (2013.01); *B41J 2/04516* (2013.01); *B41J 2002/453* (2013.01)

(58) Field of Classification Search
CPC ........................................................ B41J 2/045
See application file for complete search history.

(56) References Cited

U.S. PATENT DOCUMENTS 6,604,806 B1 8/2003 Yamada et al.
6,960,036 B1 11/2005 Fujita
7,347,519 B2 3/2008 Nagamura
8,147,019 B2 4/2012 Fujita
8,608,277 B2 12/2013 Tomida
8,733,874 B2 5/2014 Baba
8,740,333 B2 6/2014 Teshigawara
8,931,869 B2 1/2015 Kawafuji
8,931,875 B2 1/2015 Kosaka
9,114,631 B2 8/2015 Fujita
(Continued)

FOREIGN PATENT DOCUMENTS

EP 1093923 B1 2/2007
JP 2010-241148 A 10/2010
JP 2022-054901 A 4/2022

OTHER PUBLICATIONS

Aug. 2, 2024 European Official Action in European Patent Appln. No. 24157720.4.

*Primary Examiner* — Shelby L Fidler
(74) *Attorney, Agent, or Firm* — Venable LLP

(57) ABSTRACT

A printing apparatus controls an ejection timing of a printing unit such that a first distance becomes shorter than a second distance, where the first and second distances are distances in a scanning direction between a landing position at which an ink droplet lands on a printing medium in a case where the printing unit scans in a first direction and a landing position at which an ink droplet lands on the printing medium in a case where the printing unit scans in a second direction in first and second printing modes, respectively.

10 Claims, 21 Drawing Sheets

(56) References Cited

U.S. PATENT DOCUMENTS

| | | | |
|---|---|---|---|
| 9,211,748 B2 | 12/2015 | Baba | |
| 9,457,586 B2 | 10/2016 | Fujita | |
| 9,636,906 B2 | 5/2017 | Kawatoko | |
| 9,764,562 B2 | 9/2017 | Suzuki | |
| 9,889,649 B2 | 2/2018 | Baba | |
| 10,137,690 B2 | 11/2018 | Hirokawa | |
| 10,384,470 B2 | 8/2019 | Yamane | |
| 10,556,448 B2 | 2/2020 | Ohnishi | |
| 10,632,765 B2 | 4/2020 | Takeuchi | |
| 10,723,122 B2 | 7/2020 | Hirokawa | |
| 10,730,285 B2 | 8/2020 | Sakamoto | |
| 11,292,268 B2 | 4/2022 | Kawafuji | |
| 11,429,050 B2 | 8/2022 | Baba | |
| 11,794,495 B2 | 10/2023 | Kato | |
| 11,813,853 B2 | 11/2023 | Kawafuji | |
| 11,919,300 B2 | 3/2024 | Kawafuji | |
| 11,958,301 B2 | 4/2024 | Murase | |
| 2004/0046813 A1* | 3/2004 | Edamura | B41J 29/393<br>347/14 |
| 2006/0044334 A1 | 3/2006 | Fujita | |
| 2012/0218330 A1 | 8/2012 | Fujita | |
| 2015/0191009 A1 | 7/2015 | Fujita | |
| 2022/0324223 A1 | 10/2022 | Nagai | |
| 2023/0191798 A1 | 6/2023 | Nitta | |
| 2023/0202193 A1 | 6/2023 | Yamamuro | |

* cited by examiner

TBL1

| K | | HEAD HEIGHT (mm) | | | |
|---|---|---|---|---|---|
| | | ~1.0 | ~1.5 | ~2.0 | 2.0< |
| CR SPEED (INCH/SEC) | 10 | 1 | 2 | 2 | 2 |
| | 20 | 1 | 2 | 2 | 2 |
| | 40 | 1 | 3 | 3 | 3 |
| | 80 | 2 | 5 | 5 | 5 |

| C | | HEAD HEIGHT (mm) | | | |
|---|---|---|---|---|---|
| | | ~1.0 | ~1.5 | ~2.0 | 2.0< |
| CR SPEED (INCH/SEC) | 10 | 0 | 1 | 1 | 1 |
| | 20 | 0 | 1 | 1 | 1 |
| | 40 | 1 | 2 | 2 | 2 |
| | 80 | 1 | 3 | 3 | 3 |

| M | | HEAD HEIGHT (mm) | | | |
|---|---|---|---|---|---|
| | | ~1.0 | ~1.5 | ~2.0 | 2.0< |
| CR SPEED (INCH/SEC) | 10 | 0 | 1 | 1 | 1 |
| | 20 | 0 | 1 | 1 | 1 |
| | 40 | 1 | 2 | 2 | 2 |
| | 80 | 2 | 4 | 4 | 4 |

| Y | | HEAD HEIGHT (mm) | | | |
|---|---|---|---|---|---|
| | | ~1.0 | ~1.5 | ~2.0 | 2.0< |
| CR SPEED (INCH/SEC) | 10 | 0 | 0 | 0 | 0 |
| | 20 | 0 | 0 | 0 | 0 |
| | 40 | 0 | 1 | 1 | 1 |
| | 80 | 1 | 2 | 2 | 2 |

FIG.19A

TBL2

| K | | HEAD HEIGHT (mm) | | | |
|---|---|---|---|---|---|
| | | ~1.0 | ~1.5 | ~2.0 | 2.0< |
| CR SPEED (INCH/SEC) | 10 | 1 | 2 | 2 | 2 |
| | 20 | 1 | 2 | 2 | 2 |
| | 40 | 1 | 5 | 7 | 7 |
| | 80 | 3 | 9 | 13 | 13 |

| C | | HEAD HEIGHT (mm) | | | |
|---|---|---|---|---|---|
| | | ~1.0 | ~1.5 | ~2.0 | 2.0< |
| CR SPEED (INCH/SEC) | 10 | 0 | 1 | 1 | 1 |
| | 20 | 0 | 1 | 1 | 1 |
| | 40 | 1 | 2 | 2 | 2 |
| | 80 | 1 | 3 | 3 | 3 |

| M | | HEAD HEIGHT (mm) | | | |
|---|---|---|---|---|---|
| | | ~1.0 | ~1.5 | ~2.0 | 2.0< |
| CR SPEED (INCH/SEC) | 10 | 0 | 1 | 1 | 1 |
| | 20 | 0 | 1 | 1 | 1 |
| | 40 | 1 | 2 | 2 | 2 |
| | 80 | 2 | 4 | 4 | 4 |

| Y | | HEAD HEIGHT (mm) | | | |
|---|---|---|---|---|---|
| | | ~1.0 | ~1.5 | ~2.0 | 2.0< |
| CR SPEED (INCH/SEC) | 10 | 0 | 0 | 0 | 0 |
| | 20 | 0 | 0 | 0 | 0 |
| | 40 | 0 | 1 | 1 | 1 |
| | 80 | 1 | 2 | 2 | 2 |

FIG.19B

TBL3

| K | | HEAD HEIGHT (mm) | | | |
|---|---|---|---|---|---|
| | | ~1.0 | ~1.5 | ~2.0 | 2.0< |
| CR SPEED (INCH/SEC) | 10 | 0 | 0 | 0 | 0 |
| | 20 | 0 | 0 | 0 | 0 |
| | 40 | 0 | 0 | 0 | 0 |
| | 80 | 0 | 0 | 0 | 0 |

| C | | HEAD HEIGHT (mm) | | | |
|---|---|---|---|---|---|
| | | ~1.0 | ~1.5 | ~2.0 | 2.0< |
| CR SPEED (INCH/SEC) | 10 | 0 | 0 | 0 | 0 |
| | 20 | 0 | 0 | 0 | 0 |
| | 40 | 0 | 0 | 0 | 0 |
| | 80 | 0 | 0 | 0 | 0 |

| M | | HEAD HEIGHT (mm) | | | |
|---|---|---|---|---|---|
| | | ~1.0 | ~1.5 | ~2.0 | 2.0< |
| CR SPEED (INCH/SEC) | 10 | 0 | 0 | 0 | 0 |
| | 20 | 0 | 0 | 0 | 0 |
| | 40 | 0 | 0 | 0 | 0 |
| | 80 | 0 | 0 | 0 | 0 |

| Y | | HEAD HEIGHT (mm) | | | |
|---|---|---|---|---|---|
| | | ~1.0 | ~1.5 | ~2.0 | 2.0< |
| CR SPEED (INCH/SEC) | 10 | 0 | 0 | 0 | 0 |
| | 20 | 0 | 0 | 0 | 0 |
| | 40 | 0 | 0 | 0 | 0 |
| | 80 | 0 | 0 | 0 | 0 |

FIG.19C

OFFSET TBL CORRESPONDENCE TABLE

| | | PRIORITY IMAGE QUALITY | |
|---|---|---|---|
| | | RULE LINE QUALITY | GRAININESS |
| NUMBER OF PRINTING PASSES | ONE-PASS | TBL1 | TBL3 |
| | MULTI-PASS | TBL2 | TBL3 |

FIG.20

PRINTING APPARATUS, PRINTING METHOD, AND STORAGE MEDIUM

FIELD

The present disclosure relates to a technique for controlling an ejection timing from a printing head.

DESCRIPTION OF THE RELATED ART

As a printing apparatus configured to make printing by forming dots on a printing medium such as a paper sheet, there is an inkjet printing apparatus using a printing head including a plurality of rows of ink ejection ports (hereinafter, also referred to as a printing apparatus). Particularly, a serial-type printing apparatus alternately conducts (1) a main scanning in which a printing head moves while ejecting an ink from ejection ports and (2) a conveyance operation in which a printing medium is conveyed in a direction intersecting the main scanning, to print an image on the printing medium.

In such a serial-type printing apparatus, it is preferable to conduct processing to obtain an appropriate ejection timing in order to make landing positions of ink droplets ejected from the respective ejection port arrays coincide with one another (hereinafter, also referred to as registration adjustment).

Japanese Patent Laid-Open No. 2010-241148 discloses a registration adjustment method that makes landing positions coincide with each other between a forward printing and a backward printing also in bidirectional printing in which printing is made by causing a printing head to reciprocate and scan in a direction different from an array direction of ejection ports.

SUMMARY

The present disclosure provides a technique of printing an image with an improved linear quality irrespective of a printing mode in the case of conducting bidirectional printing in a serial-type printing apparatus.

A printing apparatus according to one aspect of the present disclosure includes: a scanning unit configured to cause a printing unit in which plurality of printing elements for ejecting ink are arrayed to reciprocate and scan in a first direction intersecting an array direction of the plurality of printing elements and a second direction opposite to the first direction; a setting unit configured to set one printing mode from among a plurality of printing modes including a first printing mode in which printing of an image on a predetermined region on a printing medium is completed by one scan of the printing unit in the first direction or the second direction and a second printing mode in which printing of an image on the predetermined region is completed by a plurality of scans of the printing unit including scans in both of the first direction and the second direction; and a control unit configured to control an ejection timing of the ink in a case where the printing unit scans in the first direction and an ejection timing of the ink in a case where the printing unit scans in the second direction, and control an ejection timing of the printing unit such that a first distance becomes shorter than a second distance, where the first distance is a distance in the scanning direction between a landing position at which an ink droplet lands on the printing medium in the case where the printing unit scans in the first direction and a landing position at which an ink droplet lands on the printing medium in the case where the printing unit scans in the second direction, in the first printing mode, and the second distance is a distance in the scanning direction between a landing position at which an ink droplet lands on the printing medium in a case where the printing unit scans in the first direction and a landing position at which an ink droplet lands on the printing medium in a case where the printing unit scans in the second direction, in the second printing mode.

Further features of the present disclosure will become apparent from the following description of exemplary embodiments with reference to the attached drawings.

BRIEF DESCRIPTION OF THE DRAWINGS

FIGS. 19A to 19C are diagrams showing offset tables;

FIG. 20 is a diagram showing an offset table correspondence table; and

DESCRIPTION OF THE EMBODIMENTS

Studies made by the present inventors revealed that there is a case where an image with a high linear quality cannot be outputted depending on a printing mode even in a case where adjustment values of landing positions are set by the method disclosed by Japanese Patent Laid-Open No. 2010-241148.

Hereinafter, embodiments of the present disclosure will be described in detail with reference to the attached drawings. Note that the embodiments below are not intended to limit the matters of the present disclosure, and all the combinations of features described in the present embodiments are not necessarily essential for the solution of the present disclosure. Note that the same constituents are denoted by the same reference signs, and the description thereof will be omitted. In addition, each step in a flowchart will be indicated by sign starting with "S".

First Embodiment

First, a basic configuration of an inkjet printing apparatus according to the present embodiment will be described. Thereafter, a detailed configuration for printing an image that improves the linear quality while suppressing a decrease in image quality as mentioned above will be described.

(Configuration of Inkjet Printing Apparatus)

Figure 1:
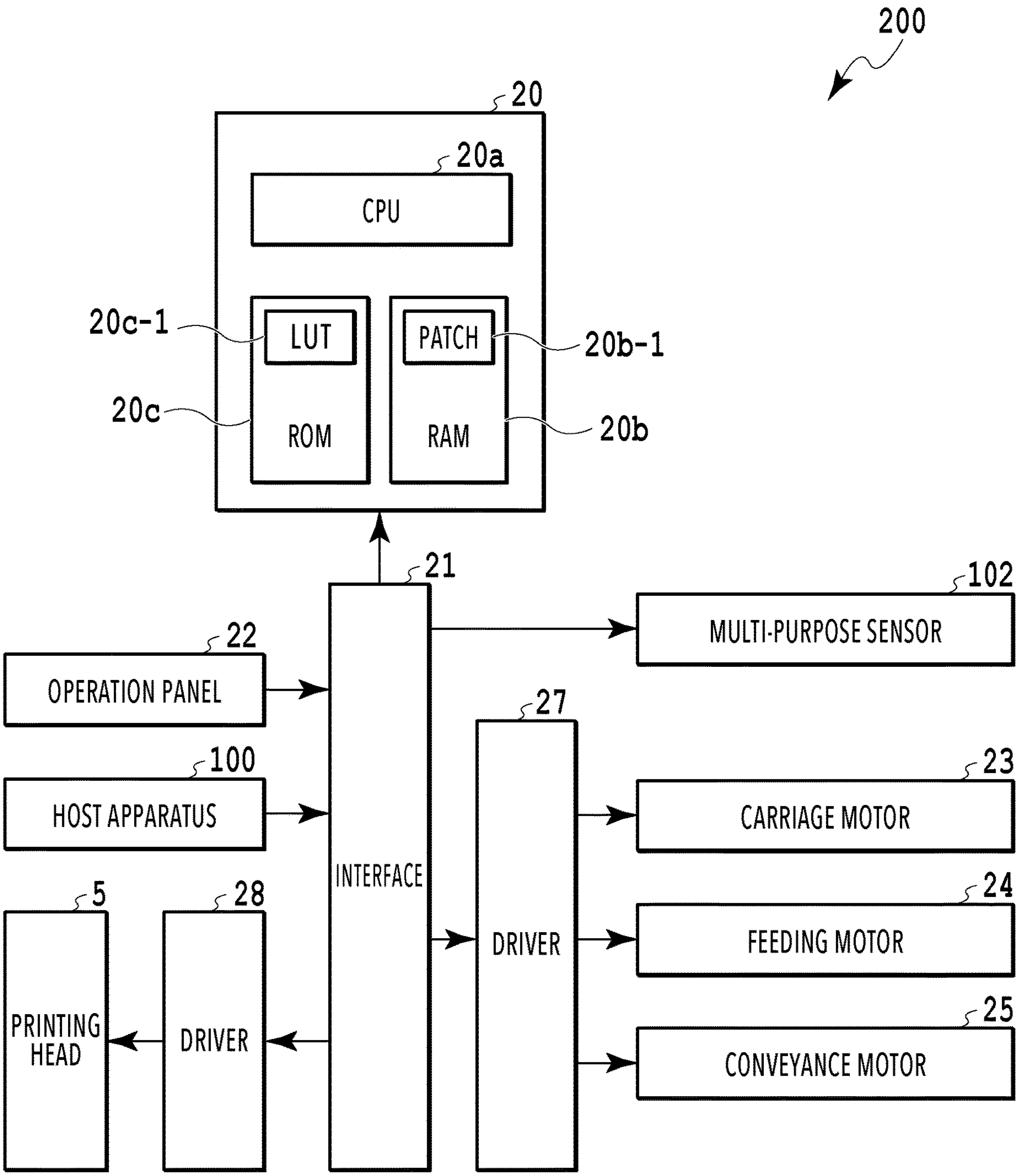
FIG. 1 is a block diagram showing a configuration of a printing system.

FIG. 1 is a block diagram showing a configuration of a printing system according to the present embodiment. The printing system of the present embodiment includes a host apparatus 100 and a printing apparatus 200. The host apparatus 100 is an information processing apparatus such as a personal computer which is connected to the printing apparatus 200.

The printing apparatus 200 includes a printing head 5, a control unit 20, a carriage motor 23, a feeding motor 24, and a conveyance motor 25.

The control unit 20 includes a CPU 20*a* such as a microprocessor as well as a ROM 20*c* and a RAM 20*b* which are memories. The ROM (Read Only Memory) 20*c* stores a control program for the CPU 20*a* and various data such as parameters necessary for the printing operation. The RAM (Random Access Memory) 20*b* is used as a work area for the CPU 20*a* and temporarily stores various data such as image data received from the host apparatus 100 and generated print data and conducts something like this. In addition, the ROM 20*c* stores a LUT (look-up table) 20*c*-1 as a table which will be described in detail later by using FIG. 7. The RAM 20*b* stores patch pattern data 20*b*-1 for printing patch patterns. Note that the LUT may be stored in the RAM 20*b*. The patch pattern data may be stored in the ROM 20*c*.

The control unit 20 conducts processing of inputting and outputting data and parameters used for printing image data and the like to and from the host apparatus 100 via an interface 21 and processing of inputting various information such as, for example, character pitch, character type, printing mode, and the like from an operation panel 22. In addition, the control unit 20 outputs ON and OFF signals for driving the motors 23 to 26 via the interface 21. Moreover, the control unit 20 outputs ejection signals and the like to a driver 28 to control the drive for ejecting an ink in the printing head.

In addition, this control system includes the interface 21, the operation panel 22, a multi-purpose sensor 102, and drivers 27 and 28. The driver 27 drives the carriage motor 23 and the feeding motor 24 in accordance with instructions from the CPU 20*a*. In addition, the driver 27 drives a first conveyance roller drive motor 25 and a second conveyance roller drive motor 26 in accordance with instructions from the CPU 20*a*. The driver 28 drives the printing head 5. Note that the carriage motor 23 is a motor for driving a carriage. The feeding motor 24 is a motor for driving a feeding roller. The first conveyance roller drive motor 25 is a motor for driving a first conveyance roller pair. The second conveyance roller drive motor 26 is a motor for driving a second conveyance roller pair.

(Configuration of Printing Apparatus and Overview of Printing Operation)

Figure 2:
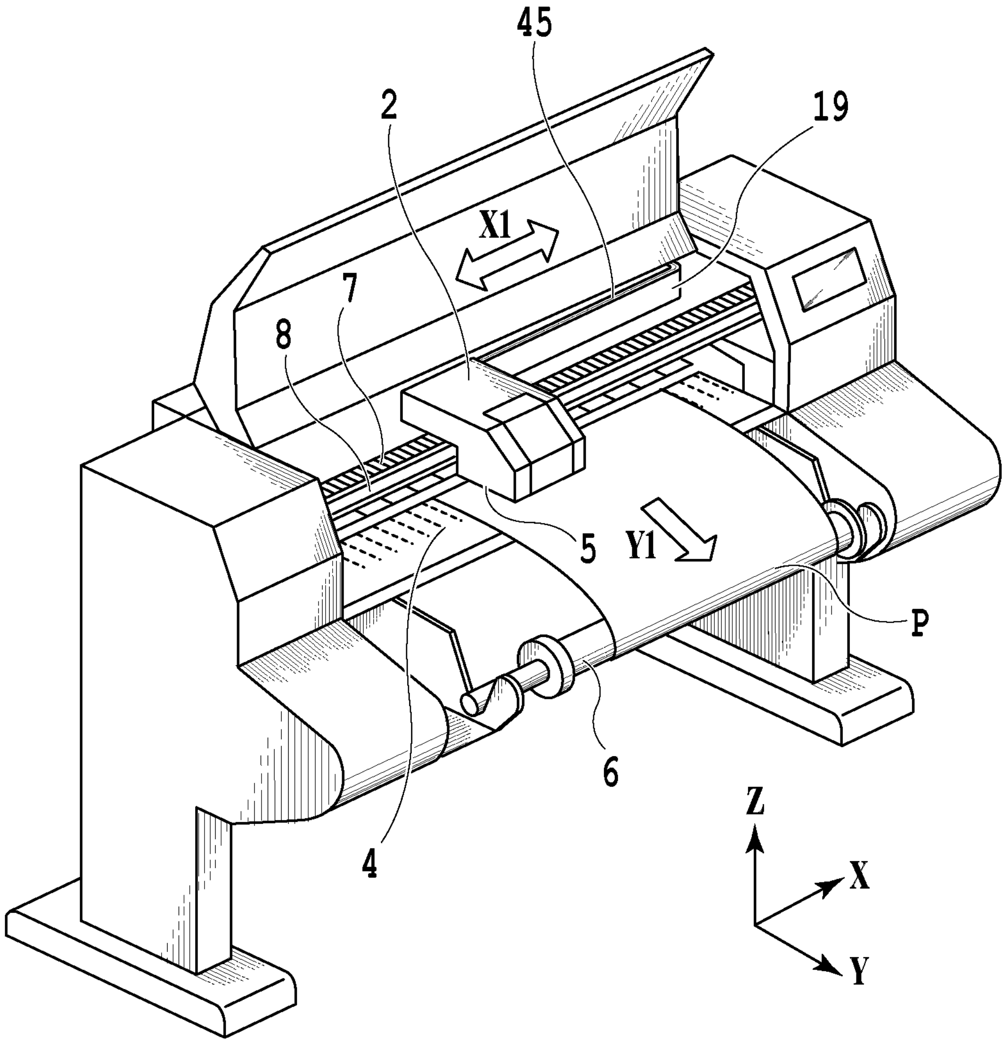
FIG. 2 is a perspective view of a printing apparatus.

A configuration of the printing apparatus 200 and overview of the operation at the time of printing will be described by using FIG. 2. FIG. 2 is a perspective view of the printing apparatus 200.

A printing medium P held in roll shape is conveyed in a Y1 direction by the feeding roller and the conveyance roller which are not shown and is driven by the feeding motor 24 and the conveyance motor 25 (see FIG. 1) via gears. On the other hand, a carriage unit 2 is capable of reciprocating and scanning (reciprocating movement) along a guide shaft 8, which extends in an X direction, by the carriage motor 23. Since the carriage unit 2 is caused to reciprocate and scan in the X1 direction in this way, the X1 direction can also be said to correspond to a scanning direction. Then, in the course of this scanning, an operation of ejecting the ink from the nozzles of the printing head 5 (described later) mounted on the carriage unit 2 is conducted at a timing based on a position signal obtained by an encoder 7, and printing is made in a certain band width corresponding to the range of array of the nozzles. The printing medium P in a region where printing is made by the printing head 5 is supported by a platen 4 from below. Once printing scan for one band is completed, printing is made by the printing head 5 in the course of scanning in the X1 direction. Hence, the X1 direction can also be said to correspond to a printing scan direction. The printing medium P is conveyed in the Y direction by the conveyance motor 25 by a distance corresponding to the above-described one band width. Images are sequentially formed on the printing medium P by the printing head 5 alternately repeating the printing scan for one band and the conveyance operation of the printing medium P in this way.

In addition, on the carriage unit 2, the multi-purpose sensor 102 (see FIG. 1), which will be described later, is mounted. This multi-purpose sensor 102 is used to detect the density of an image printed on the printing medium P, to detect the width of the printing medium P, to detect the distance from the printing head 5 to the printing medium P, and the like.

Note that transmission of drive force from the carriage motor 23 to the carriage unit 2 can be achieved by using a carriage belt. However, the method for transmitting the drive force is not limited to a carriage belt. Instead of a carriage belt, it is also possible to use, for example, another drive system such as one including: a lead screw which extends in the X1 direction and is rotationally driven by a carriage motor; and an engagement portion which is provided on the carriage unit 2 and which engages with a groove of the lead screw, and the like.

Normally, since the facing surface of the printing head 5 is capped in a non-operating state, the cap is opened to make the printing head 5 or the carriage unit 2 capable of scanning before printing. Thereafter, once data for one scan is accumulated in a buffer, the carriage unit 2 is caused to scan by the carriage motor 23 to start printing as mentioned above.

(Detail of Printing Head)

Figure 3:
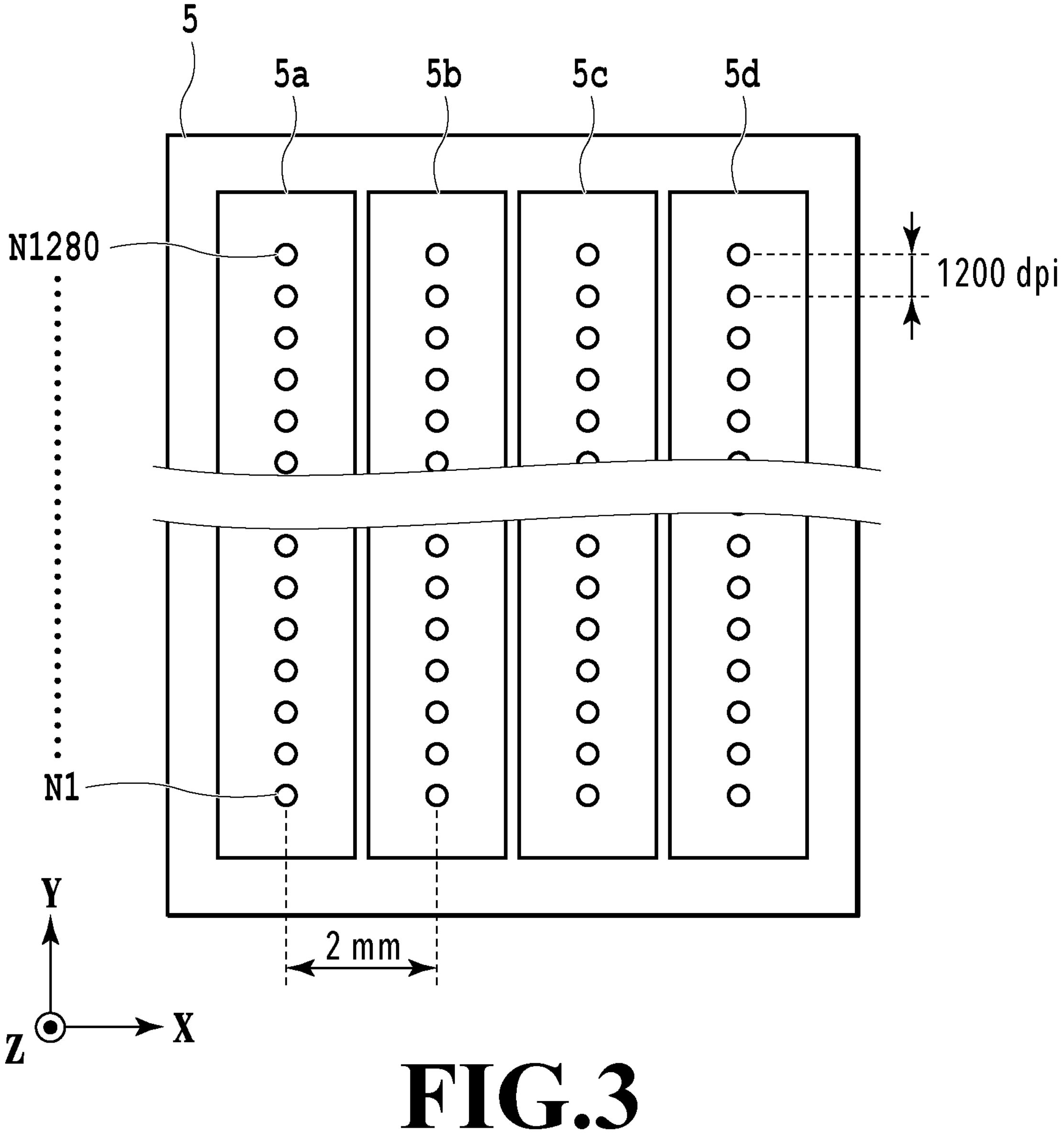
FIG. 3 is a diagram showing a printing head.

The detail of the printing head will be described by using FIG. 3. FIG. 3 is a front view of the printing head 5 of the present embodiment as viewed from above a surface in which the nozzles are arrayed.

In the printing head 5, four nozzle arrays 5*a* to 5*d* are arranged along the X direction. Each of the nozzle arrays 5*a* to 5*d* has nozzles formed at an interval of 1200 dpi along the Y direction, and includes 1280 nozzles N1 to N1280. Inside each nozzle, printing elements for ejecting the ink as droplets are provided. The printing head 5 of the present embodiment has electrothermal transducers for converting electric energy to thermal energy which are disposed inside the respective nozzles as the printing elements, and ejecting operation of ejecting the ink from ejection ports is conducted by driving these printing elements.

The nozzle arrays 5*a* and 5*b* have ink ejection ports formed such that the central interval is 2 mm therebetween along the X direction. The nozzle arrays 5*b* and 5*c* as well as the nozzle arrays 5*c* and 5*d* also have ink ejection ports formed such that the central interval is 2 mm therebetween along the X direction as in the case of the nozzle arrays 5*a* and 5*b*.

The nozzle array 5*a* is supplied with cyan (C) ink. The nozzle array 5*b* is supplied with magenta (M) ink. The nozzle array 5*c* is supplied with yellow (Y) ink. The nozzle array 5*d* is supplied with black (K) ink. Note that the number of nozzles and the number of nozzle arrays are not limited to these numbers. In addition, the types of inks are not limited to these types.

(Detail of Multi-Purpose Sensor)

Figure 4A:
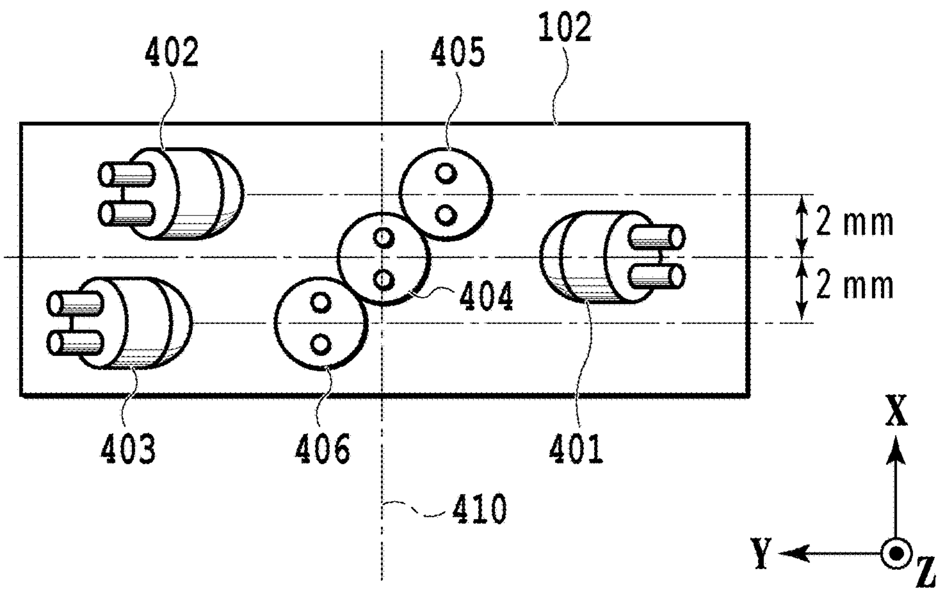
FIGS. 4A and 4B are diagrams showing a schematic configuration of a multi-purpose sensor.
Figure 4B:
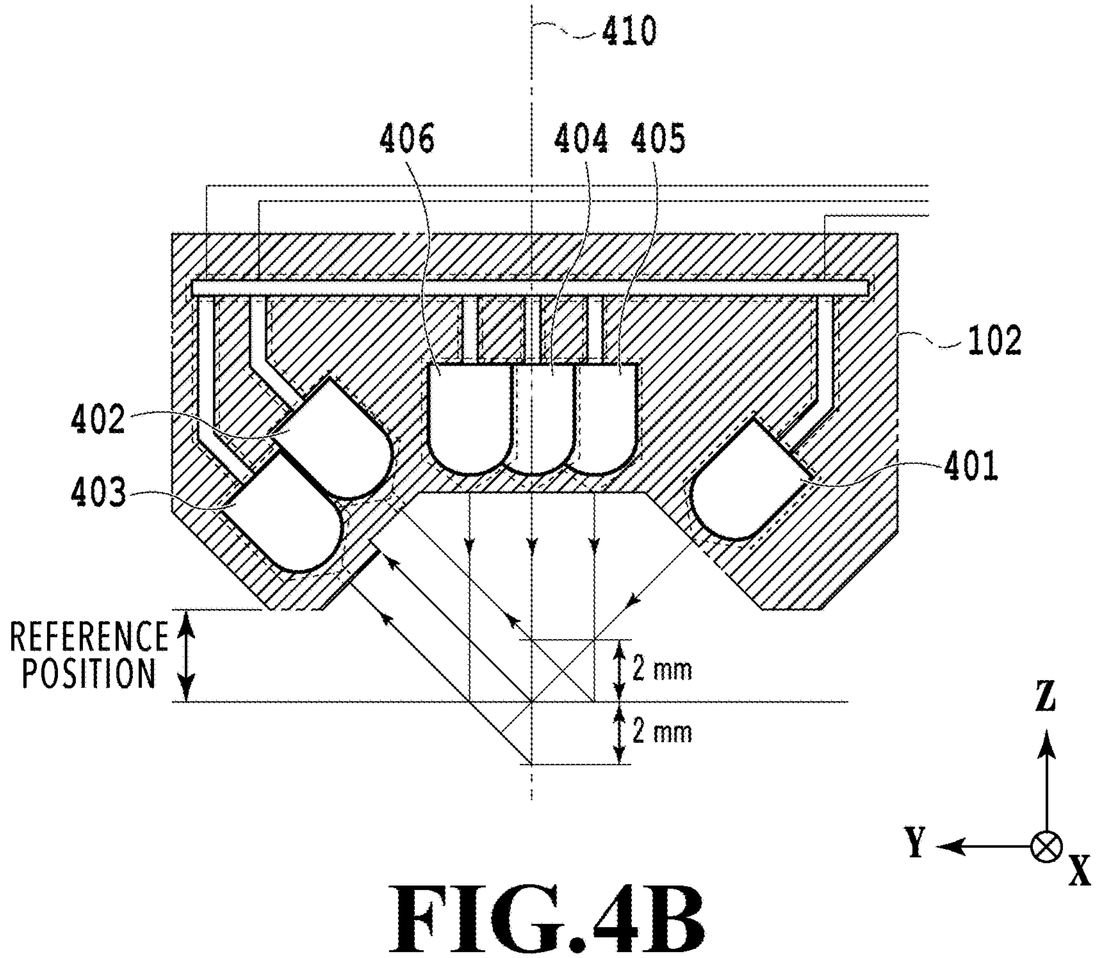

FIGS. 4A and 4B are diagrams showing a schematic configuration of the multi-purpose sensor 102. FIG. 4A shows a plan view of the multi-purpose sensor 102 as viewed in a direction perpendicular to the XY plane. FIG. 4B shows a transparent view of the multi-purpose sensor 102 as viewed in the X direction.

The multi-purpose sensor 102 has a measurement region located downstream in the Y direction, that is downstream of the printing head 5 in the conveyance direction, and has a bottom surface provided at a high position which is the same as the position of the formation surface of ejection ports of the printing head 5 or above the formation surface. The multi-purpose sensor 102 includes two phototransistors 402 and 403, three visible LEDs 404, 405, and 406, and one infrared LED 401 as optical elements. Each element is driven by using an external circuit, which is not shown. All of these elements are bullet elements having a diameter of about 4 mm in the largest portion (general mass-produced type having a size of p 3.0 mm to 3.1 mm).

Note that in the present embodiment, a line connecting the center point of an irradiation range of irradiation light emitted from a light-emitting element toward a measurement plane and the center of the light-emitting element is referred to as an optical axis of the light-emitting element or an irradiation axis. This irradiation axis also coincides with the center of a light flux of the irradiation light.

The infrared LED 401 has an irradiation angle of 45° to the surface (measurement plane) of the printing medium P which is parallel with the XY plane. Then, the irradiation axis, which is the irradiation light center of the infrared LED 401, is arranged to intersect a sensor center axis 410 which is parallel with the normal (Z axis) to the measurement plane at a predetermined position. With the position of the intersection position (intersecting point) on the Z axis as a reference position, the distance from the sensor to the reference position is referred to as a reference distance. The irradiation light of the infrared LED 401 is optimized such that the width of the irradiation light is adjusted by an opening to form an irradiation plane (irradiation region) having a diameter of about 4 mm to 5 mm on a measurement plane at the reference position.

The two phototransistors 402 and 403 have sensitivity to light having wavelengths from visible light to infrared light. The phototransistors 402 and 403 are placed such that the light receiving axes of the phototransistors 402 and 403 are parallel with the reflection axis of the infrared LED 401 in the case where the measurement plane is at the reference position. That is, the light-receiving axis of the phototransistor 402 is arranged at a position shifted by +2 mm in the X direction and shifted by +2 mm in the Z-direction from the reflection axis. In addition, the light-receiving axis of the phototransistor 403 is arranged at a position shifted by −2 mm in the X direction and shifted by −2 mm in the Z-direction. The intersecting points of the irradiation axes of the infrared LED 401 and the visible LED 404 coincide on the measurement plane, and light receiving regions of the two phototransistors 402 and 403 at this position are formed to sandwich this intersecting point, in the case where the measurement plane is at the reference position. Between the two elements, a spacer having a thickness of about 1 mm is interposed to achieve such a structure that does not allow light received at the one element to enter the other. On the phototransistor side as well, an opening is provided so as to limit a light entering range, and the size of the opening is optimized such that only reflected light having a diameter within a range of 3 mm to 4 mm of the measurement plane at the reference position can be received.

Note that in the present embodiment, a line connecting the center point of a region (range) where a light-receiving element can receive light and the center of the light-receiving element on the measurement plane (measurement target surface) is referred to as an optical axis of the light-receiving element or a light-receiving axis. This light-receiving axis also coincides with the center of a light flux of a reflected light that is reflected on the measurement plane and received by the light-receiving element.

In FIGS. 4A and 4B, the visible LED 404 is a single-color visible LED having an emission wavelength of green (about 510 nm to 530 nm), and is placed to coincide with the sensor center axis 410. In addition, the visible LED 405 is a single-color visible LED having an emission wavelength of blue (about 460 nm to 480 nm), and is placed at a position shifted by +2 mm in the X direction and shifted by −2 mm in the Y direction from the visible LED 404 as shown in FIG. 4A. Then, the irradiation axis of the visible LED 405 and the light-receiving axis of the phototransistor 402 are arranged to intersect each other on the measurement plane in the case where the measurement plane is at the reference position. Moreover, the visible LED 406 is a single-color visible LED having an emission wavelength of red (about 620 nm to 640 nm), and is placed at a position shifted by −2 mm in the X direction and shifted by +2 mm in the Y direction from the visible LED 404 as shown in FIG. 4A. Then, the irradiation axis of the visible LED 406 and the light-receiving axis of the phototransistor 403 are arranged to intersect each other on the measurement plane in the case where the measurement plane is at the reference position.

Figure 5:
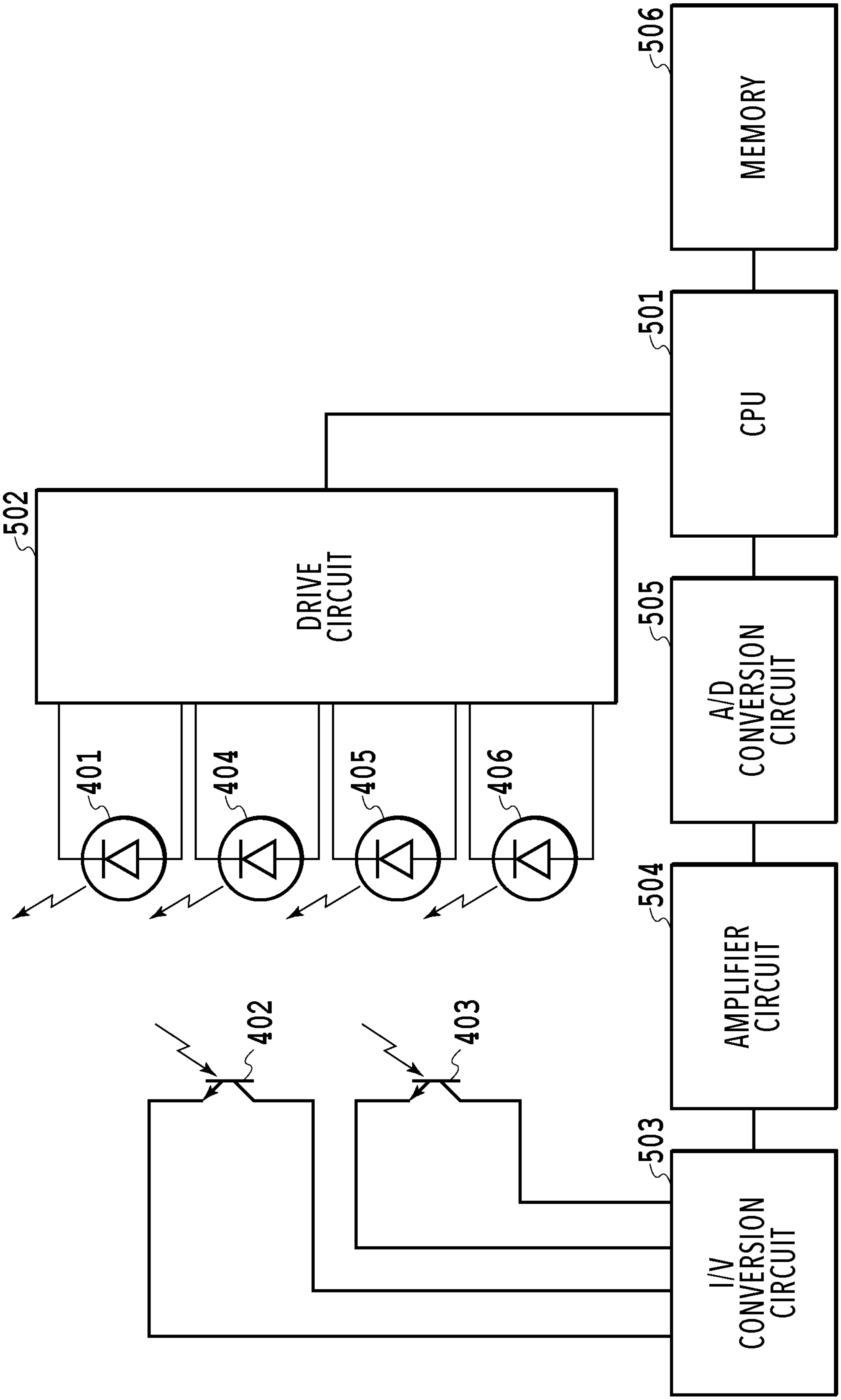
FIG. 5 is an explanatory diagram of a control circuit that processes input and output signals of the multi-purpose sensor.

FIG. 5 is a diagram showing an overview of a control circuit that processes input and output signals of each sensor of the multi-purpose sensor 102 according to the present embodiment. A CPU 501 conducts output of control signals for ON/OFF of the infrared LED 401 as well as the visible LEDs 404, 405, and 406, calculation of output signals obtained in accordance with amounts of light received by the phototransistors 402 and 403, and the like. A drive circuit 502 supplies constant current to each light-emitting element to cause the light-emitting element to emit light upon receipt of an ON signal sent from the CPU 501 and adjusts the amount of light emitted by each light-emitting element such that the amount of light received by each light-receiving element becomes a predetermined amount. An I/V conversion circuit 503 converts output signals sent as current values from the phototransistors 402 and 403 to voltage values. An amplifier circuit 504 amplifies output signals converted to voltage values, which are minute signals, to an optimum level for A/D conversion. An A/D conversion circuit 505 converts output signals amplified by the amplifier circuit 504 to 10-bit digital values and inputs the 10-bit digital values into the CPU 501. A memory 506 is, for example, a non-volatile memory or the like and used to record a reference table for deriving desired measured values from calculation results of the CPU 501 or to temporarily store output values. Note that as the CPU 501 or the memory 506, the CPU 20*a* or the RAM 20*b* of the printing apparatus may be used.

Next, a procedure of processing of detecting a color density of a pattern (patch) printed on the printing medium P by using the multi-purpose sensor 102 will be described.

First, the printing medium P is conveyed to position a region on which a pattern is to be printed on the platen 4, and the printing head 5 is caused to print a predetermined pattern (desired patch). The predetermined pattern includes a patch image printed at a printing rate of 10%, 50%, or 100% by using nozzle arrays that eject ink the density of which is desired to be measured, and the like. After the pattern is printed, a visible LED having an emission wavelength of a complementary color for the color the density of which is desired to be measured is turned on. For example, in the case where the density of a patch printed by using cyan ink is desired to be measured, the visible LED 406 having an emission wavelength of red (620 nm to 640 nm) is turned on.

Subsequently, the multi-purpose sensor 102 is moved to above a region where no color pattern has been printed on the printing medium P, and the intensity of reflected light (reflection intensity) at this time is measured by using the phototransistor 403 located on the same plane as the LED 406. The reflection intensity at this time is recorded as a reference value in the memory 506.

Subsequently, the multi-purpose sensor 102 is moved to above a region where the pattern has been printed on the printing medium P, and the reflection intensity at this time is measured in the same manner. Since part of the red light emitted from the LED 406 is absorbed by the printed cyan ink on the pattern, the reflected light becomes weaker than that in the region other than the pattern. Hence, the amount of light received by the phototransistor 403 decreases. The reflection intensity at this time is measured and recorded in the memory 506.

In the case where the reflection intensity in a region where no pattern has been printed on the printing medium P is represented by Vr, and the reflection intensity on the pattern is represented by Vp, a relative color density D on the printing medium P can be obtained by formula (1) shown below.

$$D = \log 10\ (Vr/Vp) \qquad \text{formula (1)}$$

The relative color density D obtained by the formula (1) is matched with a relative color density on a paper sheet of this type by reading a conversion table created based on properties of the printing medium P and the multi-purpose sensor 102, to obtain the color density of the pattern printed on the printing medium.

The above-described method makes it possible to measure a color density of a pattern printed on the printing medium P by using the multi-purpose sensor 102 according to the present embodiment.

A density of yellow may be measured by turning on the visible LED 405 having an emission wavelength of blue, measuring the reflection intensity by using the phototransistor 402 located on the same plane as the visible LED 405, and conducting density conversion by using a density calculation table. In the case of obtaining a density of a color pattern of magenta, the visible LED 404 having an emission wavelength of green which is disposed on the sensor center axis 410 of the multi-purpose sensor is turned on. In this case, it is possible to measure the reflection intensity by using any one of the two phototransistors 402 and 403. Hence, it is possible to detect the density of a color pattern with higher precision by averaging measured values obtained by measuring the reflection intensities by using the two phototransistors 402 and 403, respectively. Note that the method for measuring the density of a color pattern of magenta is not limited to this, and only an output of a phototransistor having better properties among the two phototransistors 402 and 403 may be used.

Next, a procedure of processing of detecting a distance to the printing medium P by using the multi-purpose sensor 102 having the above-described configuration, which is included in the printing apparatus, will be described.

Once the printing medium P is conveyed to above the platen 4 (see FIG. 2) by the conveyance roller, the carriage unit 2 is moved to a position where the multi-purpose sensor 102 faces the printing medium P, and the infrared LED 401 is turned on. Light emitted from the infrared LED 401 is reflected on the measurement plane, and the phototransistors 402 and 403 receive part of the reflected light. The outputs of the phototransistors 402 and 403 change depending on the distance to the measurement plane. The changes in outputs of the phototransistors 402 and 403 change in association with the area at which the irradiation region of the infrared LED 401 and the light receiving regions of the phototransistors 402 and 403 overlap.

Figure 6A:
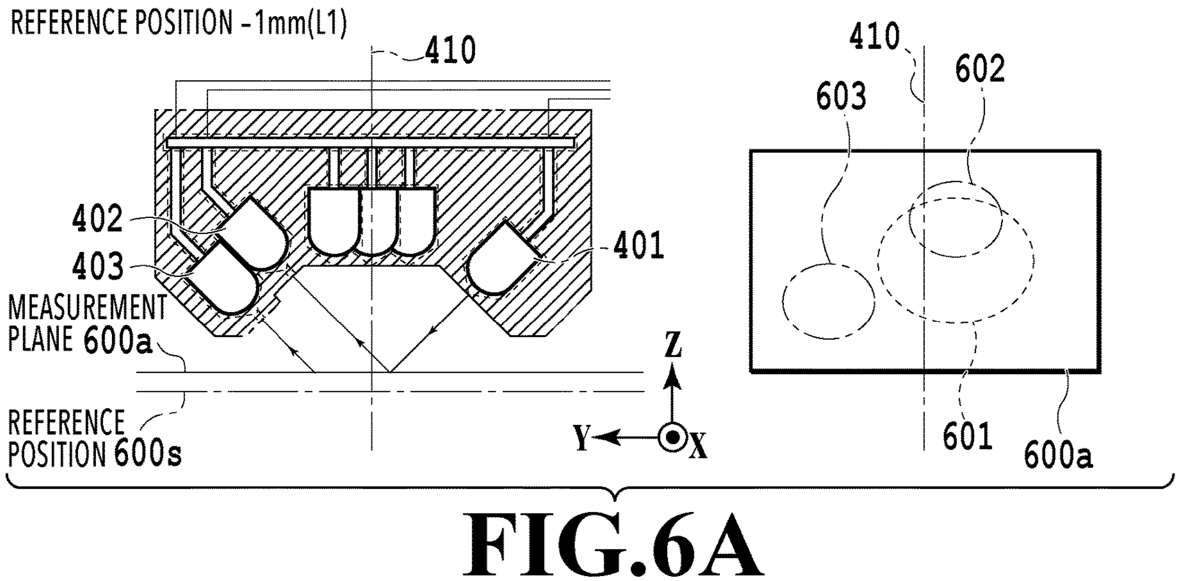
FIGS. 6A to 6C are diagrams for explaining fluctuations of an irradiation region and a light receiving region depending on a multi-purpose sensor-measurement plane distance.
Figure 6B:
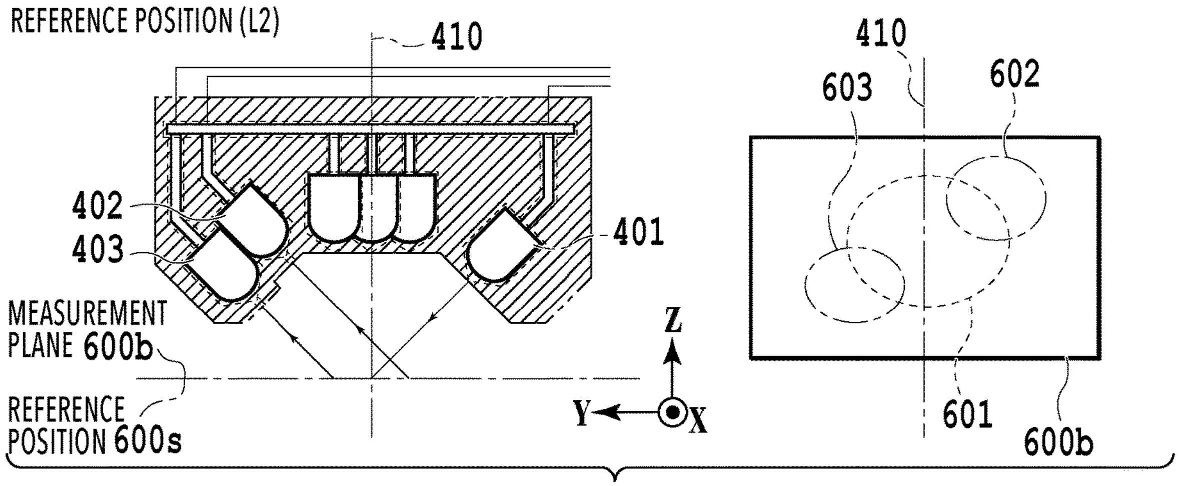
Figure 6C:
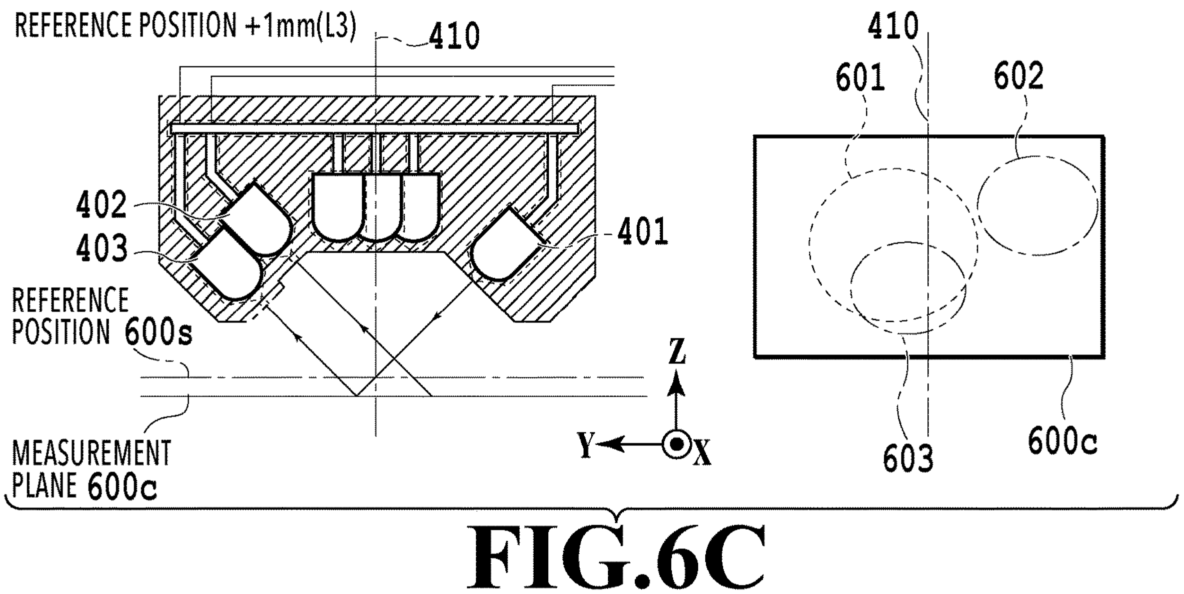

FIGS. 6A to 6C are diagrams schematically showing changes of the positions of the irradiation region and the light receiving region, which change depending on the distance from the multi-purpose sensor 102 to the measurement plane. In FIGS. 6A to 6C, sign 601 indicates the irradiation region of the infrared LED 401, sign 602 indicates the light receiving region of the phototransistor 402, and sign 603 indicates the light receiving region of the phototransistor 403.

Figure 7:
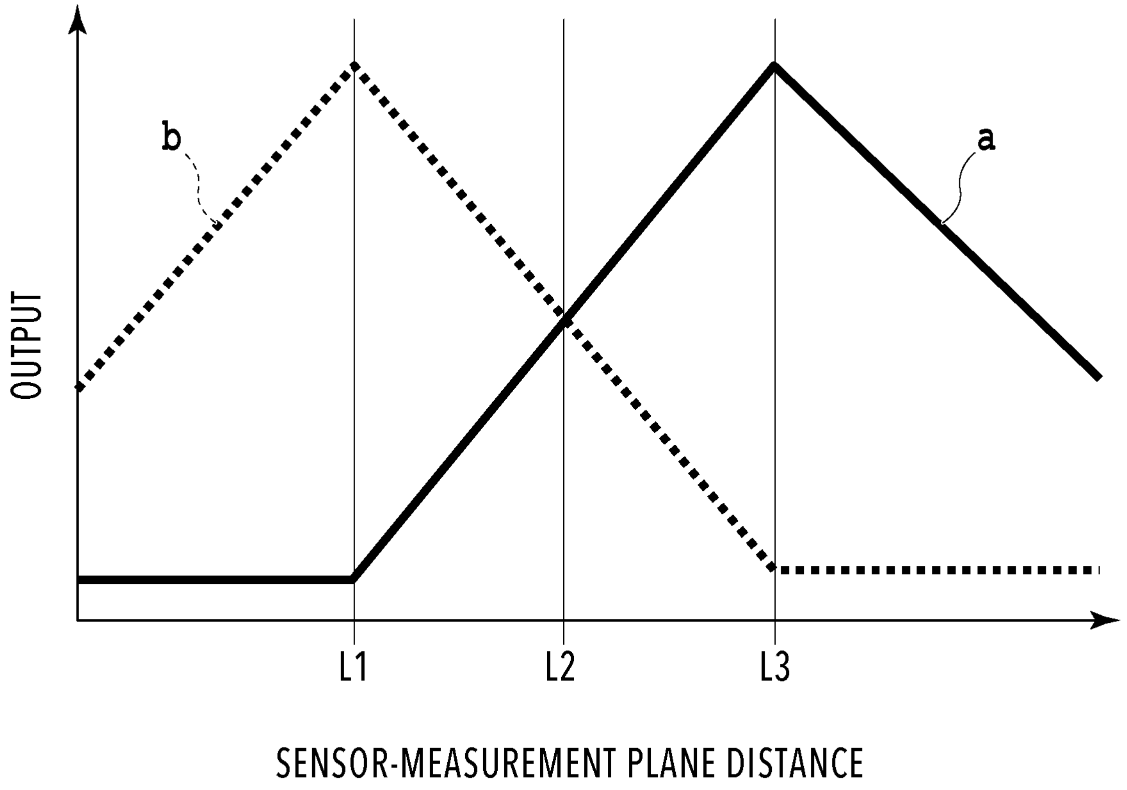
FIG. 7 is a diagram for explaining fluctuations in outputs depending on the multi-purpose sensor-measurement plane distance.

FIG. 7 is a diagram showing fluctuations in outputs of the two phototransistors depending on the distance from the multi-purpose sensor 102 to the measurement plane. In FIG. 7, sign a represents the output of the phototransistor 403, and sign b represents the output of the phototransistor 402.

As can be seen from FIGS. 6A to 6C, the centers of the light receiving regions 602 and 603 are displaced from the center of the irradiation region 601. Hence, in the arrangement of the multi-purpose sensor of the present embodiment, the overlapping of the light receiving regions 602 and 603 largely changes due to a slight fluctuation in the distance from the multi-purpose sensor to the measurement plane as compared with the arrangement of a multi-purpose sensor to measure a position where the light receiving region passes through the center of the irradiation region.

FIG. 6A shows how the irradiation region 601 and the light receiving regions 602 and 603 overlap in the case where the distance from the multi-purpose sensor 102 to the measurement plane 600*a* is about 1 mm closer than to the reference position 600*s* (L1). In this case, a large part of the light receiving region 602 coincides with the irradiation region 601. Hence, as shown in FIG. 7, the output (curve b) from the phototransistor 402 in this case has a peak on the measurement plane L1 (600*a*). In contrast, since the light receiving region 603 is displaced from the irradiation region 601, as shown in FIG. 7, the output (curve a) from the phototransistor 403 in this case is at a minimum level on the measurement plane L1 (600*a*).

FIG. 6B shows how the irradiation region 601 and the light receiving regions 602 and 603 overlap in the case where the distance from the multi-purpose sensor 102 to the measurement plane 600*b* is at the reference position 600*s* (L2). In this case, the area at which the light receiving region 602 and the irradiation region 601 coincide is substantially equal to the area at which the light receiving region 603 and the irradiation region 601 coincide. Hence, as shown in FIG. 7, the outputs (curves b and a) from the phototransistors 402 and 403 in this case are substantially equal to each other on the measurement plane L2 (600*b*) and are about ½ of that at the peak.

FIG. 6C shows how the irradiation region 601 and the light receiving regions 602 and 603 overlap in the case where the distance from the multi-purpose sensor 102 to the measurement plane 600*c* is about 1 mm farther than to the reference position 600*s* (L3). In this case, a large part of the light receiving region 603 coincides with the irradiation region 601. Hence, as shown in FIG. 7, the output (curve a) from the phototransistor 403 in this case has a peak on the measurement plane L3 (600*c*). In contrast, since the light receiving region 602 is displaced from the irradiation region 601, as shown in FIG. 7, the output (curve b) from the phototransistor 402 in this case is at a minimum level on the measurement plane L3 (600*c*).

As described above, the outputs of the phototransistors 402 and 403 change depending on the distance from the multi-purpose sensor 102 to the measurement plane. The interval between positions at which the outputs of the phototransistors 402 and 403 have peaks is determined by relative amounts of displacement of the phototransistors 402 and 403 to the Z-direction, an inclination of the phototransistors 402 and 403 to the measurement plane, and an inclination of the infrared LED 401 to the measurement plane. This arrangement is optimized based on the measurement range.

After the outputs of the phototransistors 402 and 403 which change depending on the distance to the printing medium P are obtained, the CPU 501 obtains a distance coefficient L based on these two outputs. In the case where the output of the phototransistor 402 is represented by Va and the output of the phototransistor 403 is represented by Vb, the distance coefficient L is obtained in accordance with formula (2) shown below.

$$L=(Va-Vb)/(Va+Vb) \qquad \text{formula (2)}$$

Hence, the value of the distance coefficient L changes depending on the distance from the multi-purpose sensor 102 to the measurement plane. In the case where the output (curve b in FIG. 7) of the phototransistor 402 has a peak (reference position-1 mm (L1)), the distance coefficient L has a minimum value. On the other hand, in the case where the output (curve a in FIG. 7) of the phototransistor 403 has a peak (reference position+1 mm (L3)), the distance coefficient L has a maximum value. Due to the nature of the distance coefficient L, the measurement range is desirably within the peaks of the two phototransistors 402 and 403, and in the present embodiment, the measurement range of the multi-purpose sensor 102 is the reference position±1 mm.

Once the distance coefficient L is obtained by the calculation processing in the CPU 501, the distance reference table stored in the memory 506 is read out.

Figure 8:
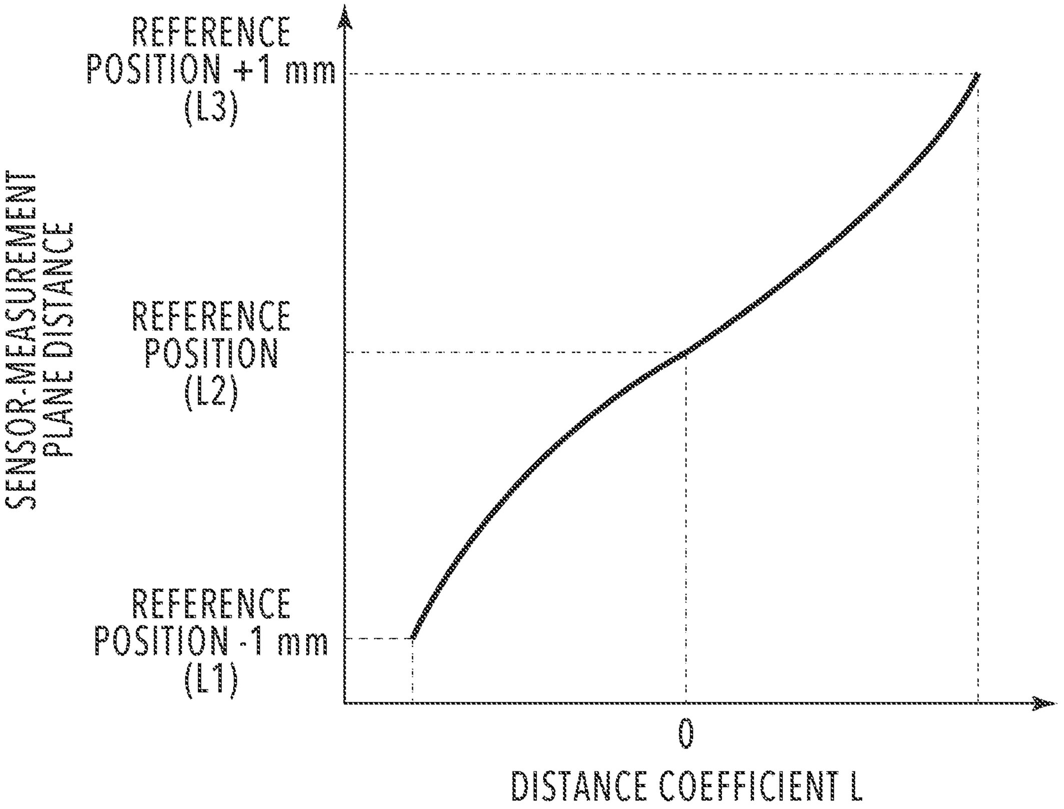
FIG. 8 is a diagram for explaining a distance reference table.

FIG. 8 is a diagram showing an example of change curve of the distance coefficient L expressed by the distance reference table.

The distance coefficient L obtained in accordance with the above-described calculation formula slightly increases in a curved manner relative to the distance due to an influence of the output characteristics of the phototransistors 402 and 403 but has substantially linear characteristic. The distance reference table is used to obtain the distance to the measurement target more precisely from the distance coefficient L obtained by the calculation.

The CPU 501 obtains the distance to the measurement target from the distance coefficient L obtained by the calculation and the distance reference table, and outputs the value of the distance. Once the distance to the measurement plane is obtained, it also becomes possible to calculate the thickness of the printing medium P and the like from a relative distance from the platen 4. That is, the thickness of the printing medium P can be obtained by obtaining a difference between a distance in the case where the platen 4 is set as the measurement plane and a distance in the case where the printing medium P is set as the measurement plane.

In the above-described manner, it becomes possible to detect the distance to the measurement plane, that is, the distance from the nozzle face of the printing head 5 to the printing medium P, by using the multi-purpose sensor 102. Hereinafter, the distance from the nozzle face to the printing medium P measured in this way is referred to as a head height.

(Ink Formulations)

Hereinafter, ink formulations in the present embodiment will be described in detail. Note that the following example is only an example, and the ink formulations are not limited at all. Note that in the description of the ink formulation below, "part" and "%" mentioned herein are based on mass unless otherwise noted.

<Preparation of Pigment Dispersion Liquids>

(Preparation of Black Pigment Dispersion Liquid)

First, 20.0 parts of a pigment, 60.0 parts of a resin aqueous solution, and 20.0 parts of water were put into a bead mill (LMZ2; produced by Ashizawa Finetech Ltd.) in which the packing factor of zirconia beads having a diameter of 0.3 mm was set to 80%, followed by dispersion at a rotation speed of 1,800 rpm for 5 hours. Note that as the pigment, carbon black (trade name Printex 90; produced by Degussa) was used. In addition, as the resin aqueous solution, an aqueous solution having a resin (solid component) content of 20.0% that contained JONCRYL 678 (produced by Johnson Polymer), which was styrene-acrylic acid copolymer, neutralized with a potassium hydroxide equivalent to the acid value was used. Thereafter, centrifugation was conducted at a rotation speed of 5,000 rpm for 30 minutes to remove an aggregated component, and further dilution with ion-exchange water was conducted to obtain a black pigment dispersion liquid in which the content of the pigment was 15.0% and the content of the water-soluble resin (dispersant) was 9.0%.

(Preparation of Magenta Pigment Dispersion Liquid)

The pigment was changed to C.I. Pigment Red 122 (trade name Toner Magenta E02; produced by Clariant). Except for this, a magenta pigment dispersion liquid in which the content of the pigment was 15.0% and the content of the water-soluble resin (dispersant) was 9.0% was obtained in the same procedure as in the preparation of the above-described black pigment dispersion liquid.

(Preparation of Cyan Pigment Dispersion Liquid)

The pigment was changed to C.I. Pigment Blue 15:3 (trade name Toner Cyan BG; produced by Clariant). Except for this, a cyan pigment dispersion liquid in which the content of the pigment was 15.0% and the content of the water-soluble resin (dispersant) was 9.0% was obtained in the same procedure as in the preparation of the above-described black pigment dispersion liquid.

(Preparation of Yellow Pigment Dispersion Liquid)

The pigment was changed to C.I. Pigment Yellow 74 (trade name Hansa Brilliant Yellow 5GX; produced by Clariant). Except for this, a yellow pigment dispersion liquid in which the content of the pigment was 15.0% and the content of the water-soluble resin (dispersant) was 9.0% was obtained in the same procedure as in the preparation of the above-described black pigment dispersion liquid.

<Preparation of Inks>

After components (unit: %) shown in the upper part of Table 1 were mixed, the mixtures were filtrated with pressure by using a membrane filter (HDCII filter; produced by Pall Corporation) having a pore size of 1.2 μm to prepare pigment-based inks 1 to 4. The amount of the ion-exchange water used was set to such a content that the total amount of the components became 100.0%. Note that Acetylenol E100 is a surfactant produced by Kawaken Fine Chemicals Co., Ltd. In the lower part of Table 1, the content (unit: %) of the pigment in each pigment-based ink is shown. The inks obtained in this way were each put into a cartridge. Note that the ink formulation is not limited to these.

TABLE 1

Compositions and properties of inks

| Ink Name | K | C | M | Y |
|---|---|---|---|---|
| Black Pigment Dispersion Liquid | 30 | | | |
| Cyan Pigment Dispersion Liquid | | 30 | | |
| Magenta Pigment Dispersion Liquid | | | 30 | |
| Yellow Pigment Dispersion Liquid | | | | 30 |
| Glycerin | 10 | 10 | 10 | 10 |
| Ethylene Glycol | 10 | 10 | 10 | 10 |
| Acetylenol E100 | 1 | 1 | 1 | 1 |
| Ion-exchange Water | 49 | 49 | 49 | 49 |
| Pigment Density | 4.5 | 4.5 | 4.5 | 4.5 |

(Registration Adjustment Processing)

As a method for registration adjustment among ejection port arrays, a reference pattern is printed on a printing medium by using a reference ejection port array, and a plurality of patterns for each of which the printing position is slightly shifted are printed on the printing medium by using the other ejection port arrays. Then, correction amounts for registration adjustment which make the printing positions coincide with one another (hereinafter, referred to as registration adjustment values) are obtained by measuring the densities of the printed patterns. In addition, as a method for registration adjustment in bidirectional printing, there is a method in which a reference pattern is printed on a printing medium by forward printing, and a plurality of patterns for each of which the printing position is shifted are printed on the printing medium by backward printing, and registration adjustment values which make the printing positions in the forward direction and the backward direction coincide with one another are obtained.

Registration adjustment values vary depending on the distance from the ejection port of the printing head to the surface of the printing medium P (head height) and the printing scan speed of the carriage unit 2 (printing head 5), but these influences are particularly large in registration adjustment in bidirectional printing. Hence, in bidirectional printing, it is preferable to set registration adjustment values for each combination of the head height and the printing scan speed of the carriage. This makes it possible to align landing positions at the time of bidirectional printing irrespective of the head height or the printing scan speed of the carriage.

Here, an example of a configuration of registration adjustment patterns used at the time of registration adjustment processing will be described by using FIGS. 9A and 9B and FIG. 10.

Figure 9A:
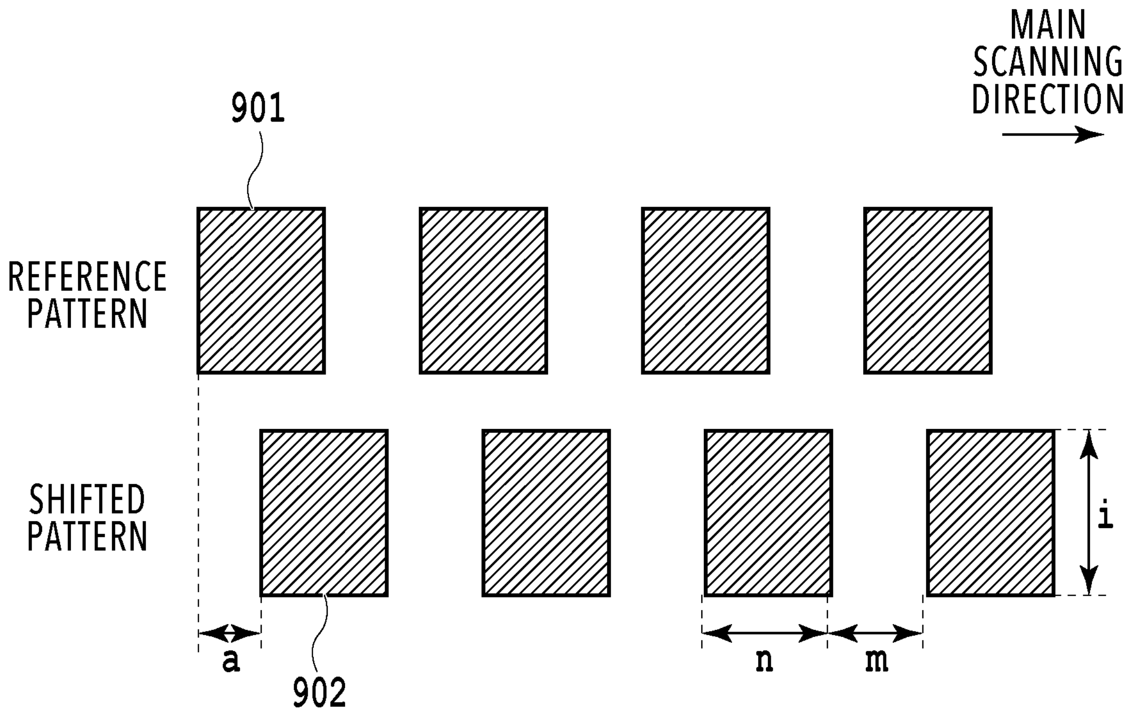
FIGS. 9A and 9B are diagrams for explaining registration adjustment patterns.

FIG. 9A is a diagram for explaining an example of a configuration of registration adjustment patterns in the case of detecting density by using the multi-purpose sensor 102. The registration adjustment patterns are configured such that rectangular patterns of i pixels×n pixels are periodically repeated after each blank region of m pixels in a main scanning direction (X direction). In addition, shifted patterns 902 are printed while the printing positions are shifted by a predetermined number of pixels a from reference patterns 901. In the case of bidirectional printing, the reference patterns 901 are printed by printing scan in the forward direction, while the shifted patterns 902 are printed by printing scan in the backward direction. The resolution and the shifted amount of these registration adjustment patterns may be determined in accordance with the printing resolution of the printing apparatus. Note that in the present embodiment, the printing resolution is assumed to be 1200 dpi. Note that although FIG. 9A shows the reference patterns and the shifted patterns by shifting the reference patterns and the shifted patterns in a vertical direction (a direction orthogonal to the main scanning direction) for the sake of explanation, these two patterns 901 and 902 are printed in an overlapping manner in practice. That is, the reference pattern 901 is printed while being overlapped with the shifted pattern 902 which is shifted by the predetermined number of pixels a in the main scanning direction.

Figure 9B:
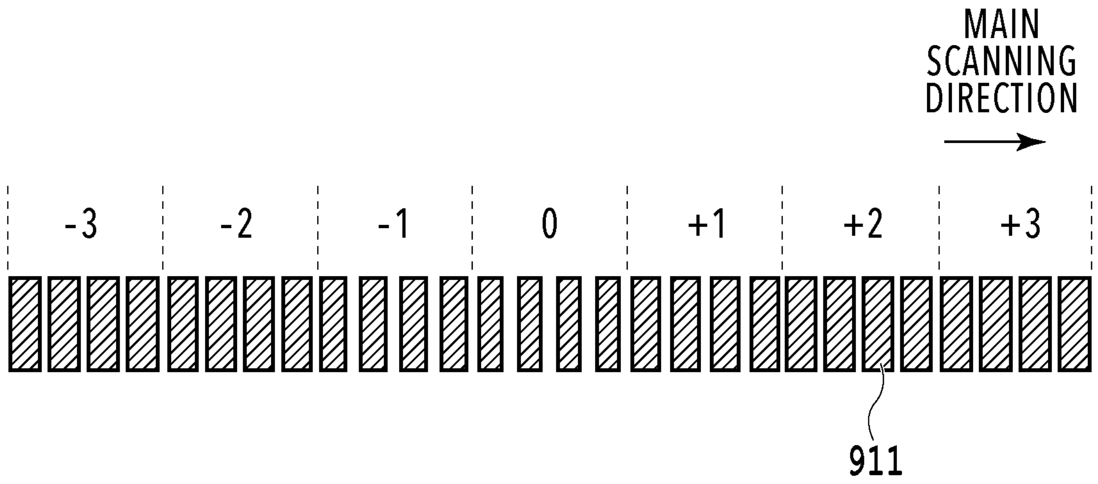

FIG. 9B is a diagram showing an example in which a plurality of the registration adjustment patterns shown in FIG. 9A are printed side by side in the main scanning direction. In this case, a registration adjustment pattern group 911 shown in FIG. 9B is printed while the amount of shift a of the shifted pattern is changed from −3 pixels to +3 pixels. That is, as can be seen from FIG. 9B, in the case where the amount of shift a is 0, the reference pattern and the shifted pattern are printed in such a manner as to be almost completely overlapped with each other. On the other hand, as the amount of shift a is shifted away from 0, the shift between the reference pattern and the shifted pattern increases, so that the width of the pattern increases. Note that FIG. 9B shows an example in which the shift between the reference pattern and the shifted pattern decreases in the case where the amount of shift is 0 (in the case where the registration adjustment value is 0) for the sake of convenience. In the case where the registration adjustment patterns are printed in practice, the position at which the shift between the reference pattern and the shifted pattern is small varies depending on various conditions including individual differences of the printing apparatus and the printing head.

As the amount of shift of the printing position of the reference pattern and the shifted pattern changes, the area ratio of the ink landing on the printing medium changes as shown in FIG. 9B.

Figure 10:
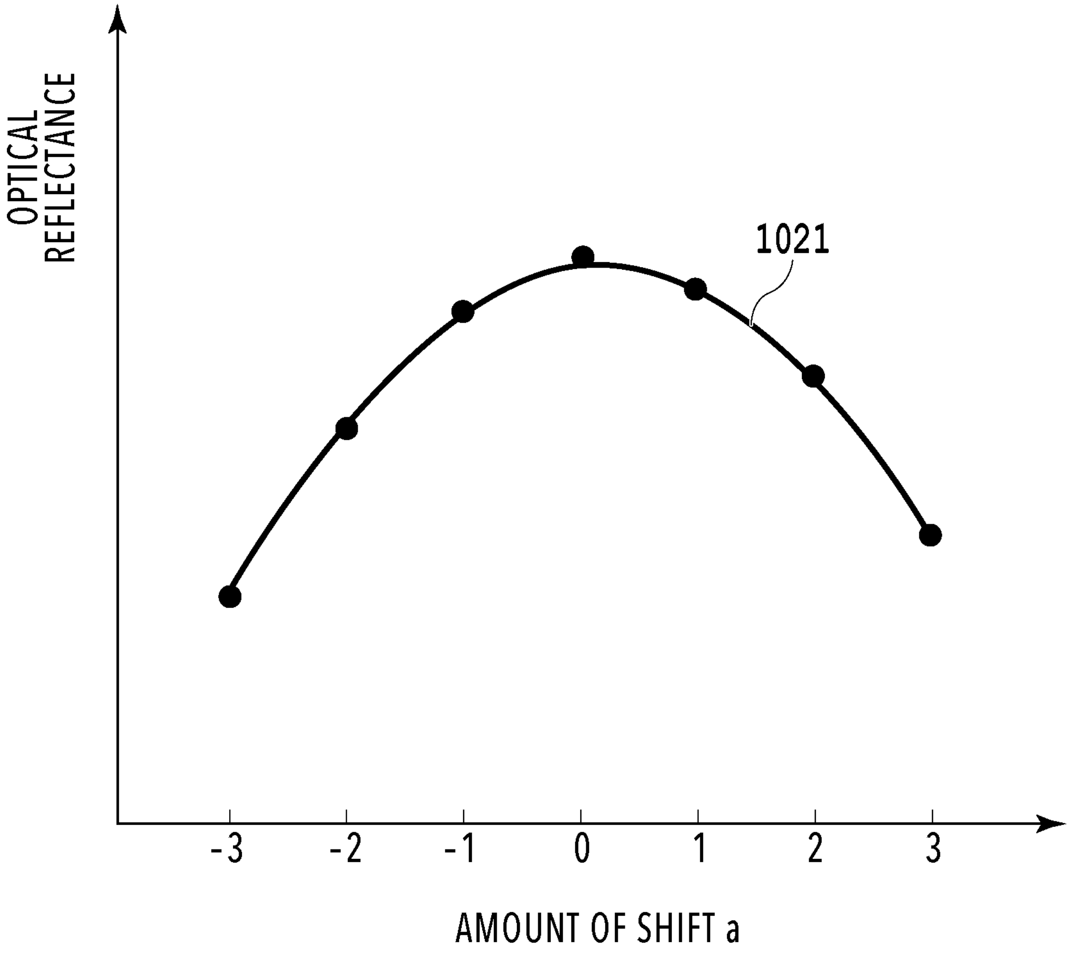
FIG. 10 is a graph representing an example of densities detected from the registration adjustment pattern and an approximate curve.

FIG. 10 shows a result 1021 of measuring an optical reflectance in the case where each displaced pattern shown in FIG. 9B is measured by using the multi-purpose sensor 102. Note that the density is in a reverse relationship with the optical reflectance, and the smaller the shift in position between the registration adjustment patterns actually printed on the printing medium is, the lower the density becomes. That is, a shifted pattern having a higher optical reflectance becomes a pattern in which a smaller shift in position occurs, and the registration adjustment value may be set based on the amount of shift a of a registration adjustment pattern for which the density is detected to be the lowest.

Note that the number of registration adjustment patterns formed on a printing medium and the amount of shift may be determined in accordance with a correction range required for the mechanical tolerance of the apparatus or a shift unit of printing positions, that is, may be determined in accordance with the precision of the registration adjustment processing. In addition, the printing area of the registration adjustment patterns may be determined in accordance with the size of the detection region of the multi-purpose sensor 102, the region width which can be printed by the carriage unit 2 through one printing scan, the size of the printable region of the registration adjustment pattern group on the printing medium, or the like.

In addition, the nozzle array used for forming the reference patterns and shifted patterns is different depending on the type of registration adjustment to be made. For example, in the case of conducting registration adjustment between the ejection port arrays, reference patterns are formed by selecting a reference nozzle array (for example, 5*d*), and shifted patterns are formed by using another nozzle array (for example, 5*b*). In addition, registration adjustment at the time of bidirectional printing can also be conducted in the same manner as described above. For example, in the formation of reference patterns, forward printing is conducted by using the nozzle array 5*d*, while in the formation of displaced patterns, backward printing is conducted by using the nozzle array 5*d*. This makes it possible to conduct adjustment with high precision also in a nozzle array (for example, the nozzle array 5*a*) other than the nozzle array 5*d* by using a registration adjustment value obtained by using the nozzle array 5*d* in combination. The combination of nozzle arrays is not limited to this, and nozzle arrays may be combined as appropriate.

The registration adjustment values are determined based on the amount of shift a determined in this way. The registration adjustment values are values indicating the correction amounts for the ejection timing of the ink, and the ejection timing of the ink of each nozzle array is controlled based on this registration adjustment value.

Note that the registration adjustment value is not limited to the result of detecting density of patterns with a multi-purpose sensor, and may be determined by using a scanner or a specular reflection sensor, or visually. In addition, the registration adjustment value may be stored in the ROM 20*c* or the RAM 20*b*.

(Number of Printing Passes)

In the case of bidirectional printing, there are one-pass printing and multi-pass printing. In one-pass printing, printing on a first region (band region) which continues in the conveyance direction of a printing medium is completed by forward scanning, and printing on a second region (band region) which is adjacent to the first region in the conveyance direction of the printing medium is completed by backward scanning. That is, in the one-pass printing, printing on a predetermined region on a printing medium is completed by scanning once in the first direction or the second direction. In the multi-pass printing, printing on a predetermined region on a printing medium is completed by twice or more of reciprocating and scanning. That is, in the multi-pass printing, an image of the predetermined region is printed by at least one printing scan in the first direction and at least one printing scan in the second direction. Note that the forward direction and the backward direction can be said to be the first direction and the second direction in which a printing head in which a plurality of nozzles for ejecting ink are arrayed intersects an array direction of the nozzles.

Figure 11A:
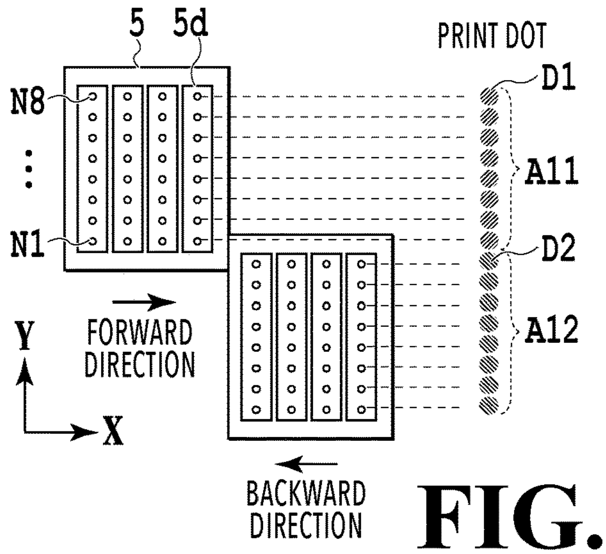
FIGS. 11A to 11C are diagrams for explaining the number of printing passes.
Figure 11B:
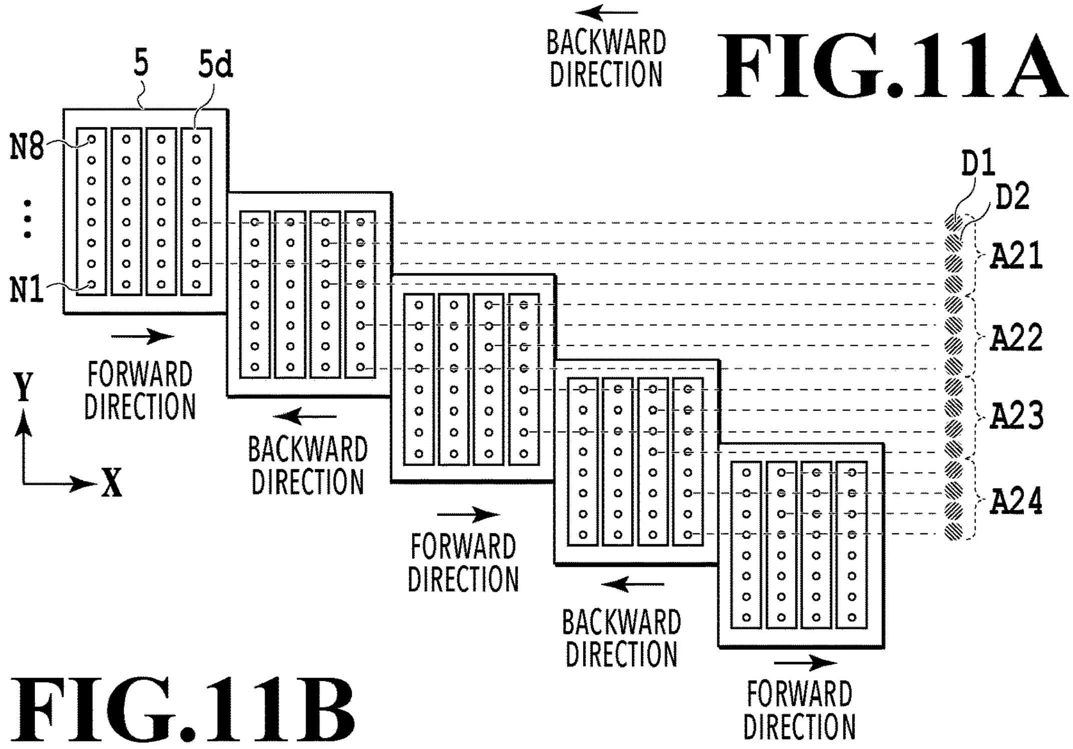
Figure 11C:
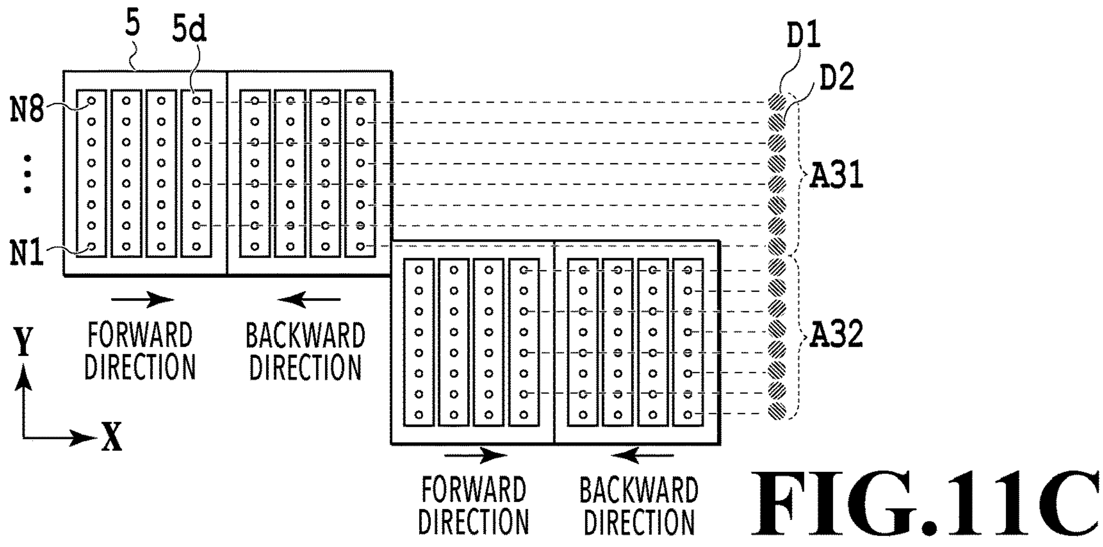

FIGS. 11A to 11C are diagrams for explaining the number of printing passes. FIGS. 11A to 11C show an example in which the number of nozzles of the nozzle array 5*d* of the printing head 5 is 8.

FIG. 11A shows an example of one-pass bidirectional printing in which the number of printing passes is 1. First, print dots D1 are printed on a region A11 by only forward scanning from a nozzle array 5*d*. Subsequently, the printing medium is conveyed in the Y direction by a distance corresponding to a length of the nozzle array, that is, a distance corresponding to the width of the region A11, and print dots D2 are printed on a region A12 by only backward scanning. That is, printing is completed on the region A11 and the region A12 which is adjacent to the region A11 in the conveyance direction of the printing medium by scanning in one of the forward direction and the backward direction. Note that although an array of dots aligned in one array in the Y direction is shown here, the region A11 and the region A12 are regions in band unit, and each contains dots arrayed in the X direction.

FIG. 11B shows an example of two-pass bidirectional printing in which the number of printing passes is 2. First, print dots D1 are printed on a region A21 by forward scanning from a nozzle array 5*d*. Then, the printing medium is conveyed in the Y direction by a distance corresponding to a half of a length of the nozzle array, and print dots D2 are printed on the region A21 and a region A22 by backward scanning. Then, the printing medium is conveyed in the Y direction by a distance corresponding to the half of the length of the nozzle array, and print dots D1 are printed on the region A22 and a region A23 by forward scanning. Then, the printing medium is conveyed in the Y direction by a distance corresponding to the half of the length of the nozzle array, and print dots D2 are printed on the region A23 and a region A24 by backward scanning. Then, the printing medium is conveyed in the Y direction by a distance corresponding to the half of the length of the nozzle array, and print dots D1 are printed on the region A24 by forward scanning. That is, printing is completed on the regions A21 to A24 by scanning in both of the forward direction and the backward direction. Note that although the print dots D1 printed by forward scanning and the print dots D2 printed by backward scanning are alternately arranged in the Y direction in the drawings, the arrangement of the print dots D1 and the print dots D2 is not limited to this. The positions of the print dots D1 printed by forward scanning and the positions of the print dots D2 printed by backward scanning only have to be complementary to each other, and for example, printing may be made by using a mask pattern prepared in advance. In the case where such multi-pass printing is conducted, dots aligned in the X direction are printed while being made complementary to each other with a plurality of (two in the case of FIG. 11B) nozzles. Hence, it is possible to make variations in ejection performance of individual nozzles less noticeable on an image.

FIG. 11C shows another example of two-pass bidirectional printing. First, print dots D1 are printed on a region A31 by forward scanning from the nozzle array 5*d* of the printing head 5. Subsequently, print dots D2 are printed on the region A31 by backward scanning also from the nozzle array 5*d*. Then, the printing medium is conveyed in the Y direction by a distance corresponding to a length of the nozzle array. Next, print dots D1 are printed on a region A32 by forward scanning from the nozzle array 5*d* of the printing head 5. Subsequently, print dots D2 are printed on the region A32 by backward scanning also from the nozzle array 5*d*. That is, printing is completed on the region A31 and the region A32 which is adjacent to the region A31 in the conveyance direction of the printing medium by scanning in both of the forward direction and the backward direction using the nozzle array 5*d* of the printing head 5. Although in FIG. 11C as well, the print dots D1 printed by forward scanning and the print dots D2 printed by backward scanning are alternately arranged in the Y direction as in the case of FIG. 11B, the arrangement of the print dots D1 and the print dots D2 is not limited to this. The positions of the print dots D1 printed by forward scanning and the positions of the print dots D2 printed by backward scanning only have to be complementary to each other, and for example, printing may be made by using a mask pattern prepared in advance.

Note that two-pass bidirectional multi-pass printing has been described in FIGS. 11B and 11C, the number of multi-passes may also be set to a larger number. Printing can be employed as the bidirectional multi-pass printing of the present embodiment as long as the printing is configured to complete an image on a predetermined region of a printing medium by at least one printing scan in the forward direction and at least one printing scan in the backward direction.

(Main Droplet and Satellite)

Meanwhile, in an inkjet printing apparatus, in a single ejection control, there is a case where besides a main dot which is ejected from an ink ejection port and lands on a sheet surface, a small droplet of ink separated from a main droplet of the ink which forms the main dot lands on a sheet surface to form a small dot.

This small dot is called a "satellite" or "sub dot". A small droplet that forms this satellite is originally ejected simultaneously together with a main droplet, and a tail portion is generated on the rear side of the main droplet by a tension between the main droplet and the liquid surface of the meniscus at the ink ejection port, and this tail portion is separated as the small droplet to turn into a spherical shape by surface tension. Hence, it is considered that a small droplet (hereinafter, also referred to as a sub droplet) which forms a satellite is more affected by a rearward action caused by a surface tension as being separated from the meniscus at the ink ejection port than a main droplet, so that an ejection speed of the small droplet is slower than the main droplet. For this reason, in the configuration of ejecting ink while moving the printing head 5 as in the present embodiment, displacement is generated between the main dot which is formed by the main droplet and the satellite on the printing medium.

Here, the displacement in landing position between the main droplet and the sub droplet of the ink ejected from an inkjet printing apparatus will be described.

Figure 12A:
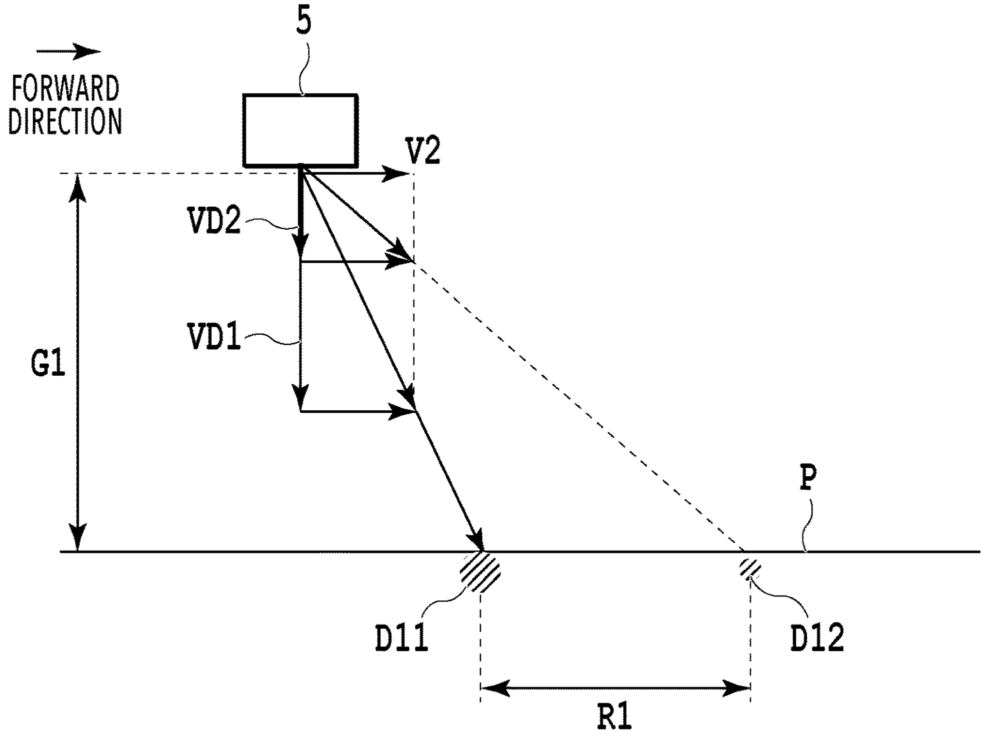
FIGS. 12A and 12B are diagrams showing positions of a main dot and a sub dot ejected from the printing head.
Figure 12B:
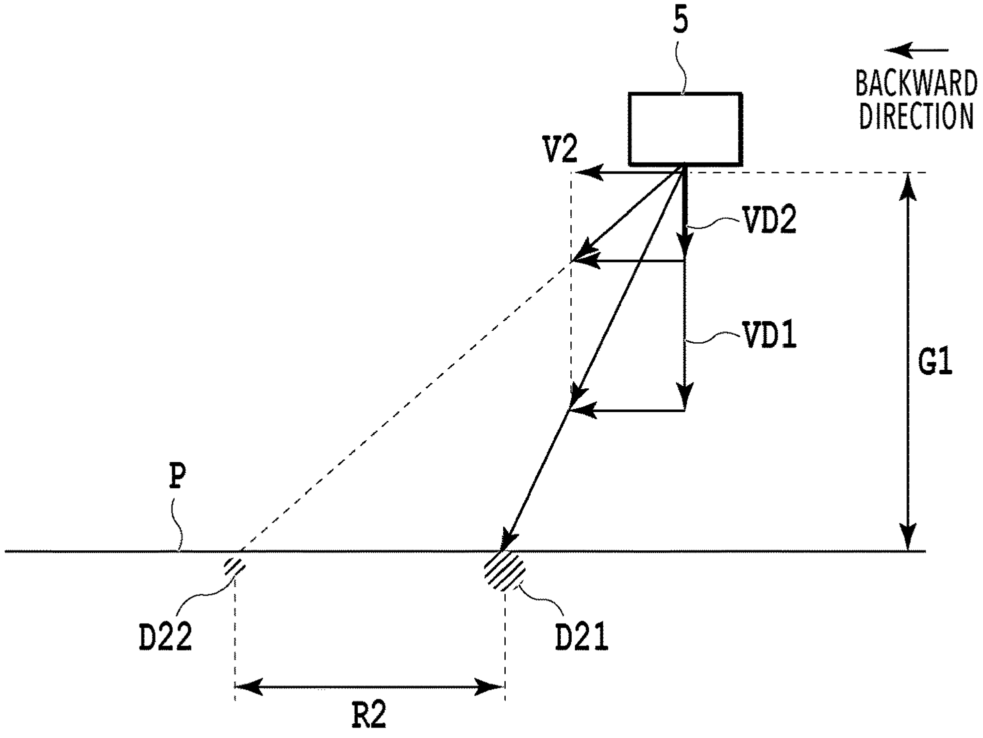

FIGS. 12A and 12B are diagrams showing positions of a main dot and a sub dot (satellite) ejected from the printing head 5. However, it is assumed that the distance from the ink ejection port (nozzle orifice) of the printing head 5 to the printing medium P (head height) is G1, and the carriage unit 2 is caused to scan in the forward direction or the backward direction at a scan speed V2.

FIG. 12A shows landing positions in the case where printing is made in the forward direction. A main dot D11 represents the landing position of a main droplet ejected at an ejection speed VD1. A sub dot D12 represents the landing position of a sub droplet ejected at an ejection speed VD2. Sign R1 represents a distance between the main dot D11 and the sub dot D12 in the X direction, which is the scanning direction.

FIG. 12B shows landing positions in the case where printing is made in the backward direction. A main dot D21 represents the landing position of a main droplet ejected at an ejection speed VD1. A sub dot D22 represents the landing position of a sub droplet ejected at an ejection speed VD2. Sign R2 represents a distance between the main dot D21 and the sub dot D22 in the X direction, which is the scanning direction.

Figure 13A:
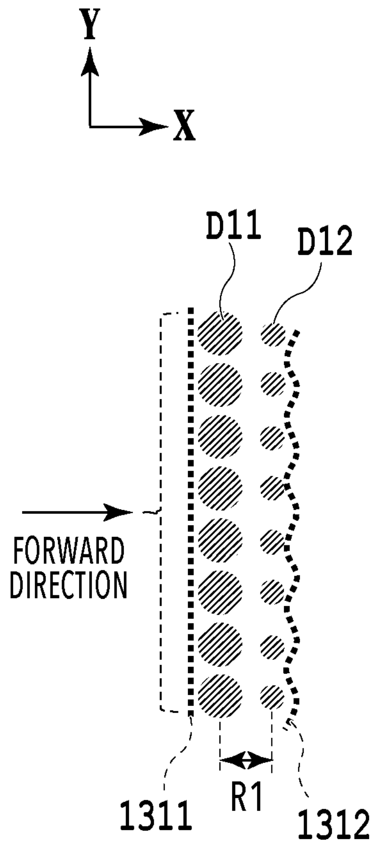
FIGS. 13A and 13B are diagrams showing landing images of main dots and sub dots in the case where rule lines are printed.
Figure 13B:
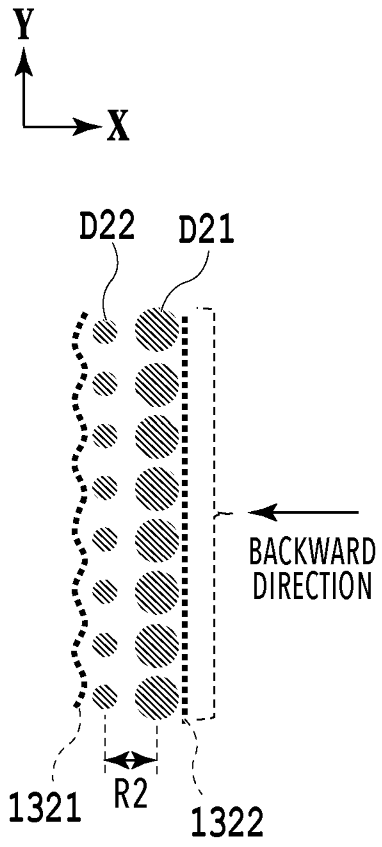

FIGS. 13A and 13B are diagrams showing a landing image of main dots and sub dots in the case where a rule line extending in the Y direction is printed as a fine line. However, these are assumed to be in the case where ink is ejected from the nozzle array 5*b* under the ejection conditions shown in FIGS. 12A and 12B. FIGS. 13A and 13B show examples where the number of nozzles of the nozzle array 5*d* is 8.

FIG. 13A shows a landing image in the case where printing is made in the forward direction. It is confirmed that an edge portion 1311 of the fine line on the upstream side in the forward direction has a linear shape in the Y direction, has a low fine line roughness, and has a high fine line quality. It is confirmed that an edge portion 1312 of the fine line on the downstream side in the forward direction has a wavelike shape in the Y direction, and has a high fine line roughness. FIG. 13B shows a landing image in the case where printing is made in the backward direction. It is confirmed that an edge portion 1322 of the fine line on the upstream side in the backward direction has a linear shape in the Y direction, has a low fine line roughness, and has a high fine line quality. It is confirmed that an edge portion 1321 of the fine line on the downstream side in the backward direction has a wavelike shape in the Y direction, and has a high fine line roughness.

Figure 14A:
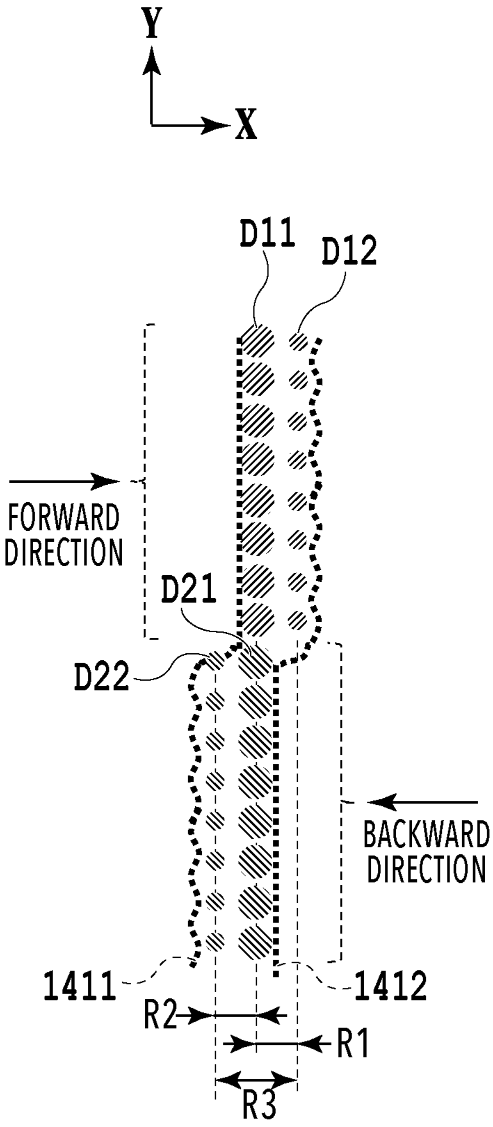
FIGS. 14A and 14B are diagrams showing landing images on a printing medium at the time of one-pass and multi-pass printing.
Figure 14B:
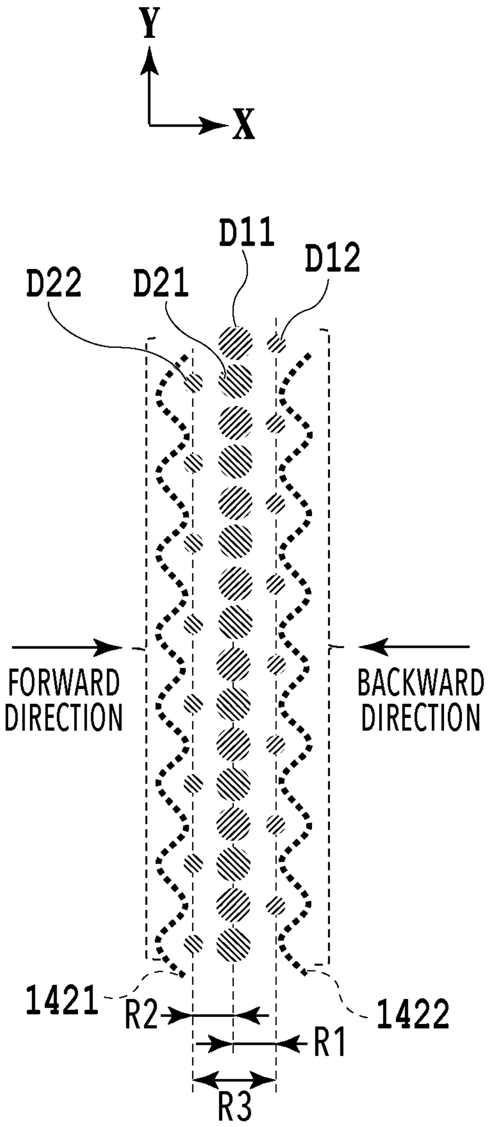

FIGS. 14A and 14B are diagrams showing landing images of main droplets and sub droplets in the case where rule lines are printed in one-pass bidirectional and multi-pass bidirectional manners. However, these are assumed to be in the case where ink is ejected from the nozzle array 5*b* while the carriage unit (hereinafter also referred to as a CR unit) is caused to reciprocate and scan under the ejection conditions shown in FIGS. 12A and 12B and FIGS. 13A and 13B. FIGS. 14A and 14B show the cases where printing is made with such registration adjustment values that the positions of main dots are aligned in the Y direction at the time of bidirectional printing, that is, the positions of the main dots printed in the forward direction and the main dots printed in the backward direction in the X direction coincide with each other. In FIGS. 14A and 14B, sign R3 represents a distance between sub dots D12 printed in the forward direction and sub dots D22 printed in the backward direction in the X direction. That is, the sign R3 can also be said to represent the size of the fine line in the width direction.

FIG. 14A shows a landing image in the case where printing is made in a one-pass bidirectional manner. Sub dots D12 printed by scanning in the forward direction are shifted to the upstream side in the backward direction relative to main dots D21 printed by scanning in the backward direction, and sub dots D22 printed by scanning in the backward direction are shifted to the upstream side in the forward direction relative to main dots D11 printed by scanning in the forward direction. Hence, it is confirmed that edge portions 1411 and 1412 of the rule line are not aligned with each other but displaced from each other in the Y direction between the forward printing and the backward printing. That is, there is a case where the rule line is visually recognized to be misaligned in the Y direction.

FIG. 14B shows a landing image in the case where printing is made in a multi-pass bidirectional manner. Although main dots D11 and D21 are aligned in the Y direction, sub dots D12 and D22 with smaller droplets than the main dots D11 and D21 are located alternately on the downstream side in the forward direction and on the downstream side in the backward direction in the Y direction, so that the rule line is visually recognized to be blurred.

Figure 15A:
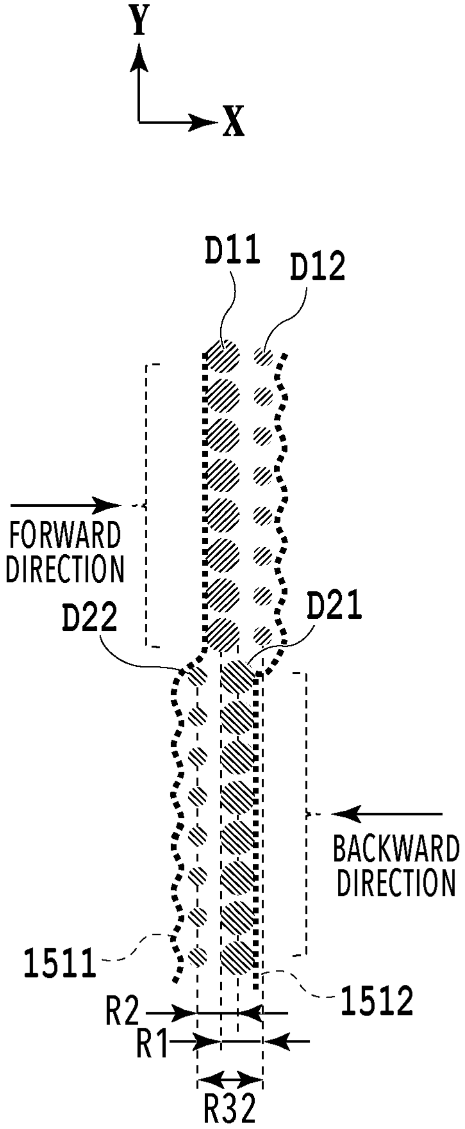
FIGS. 15A and 15B are diagrams showing landing images in the case where registration adjustment values are offset.
Figure 15B:
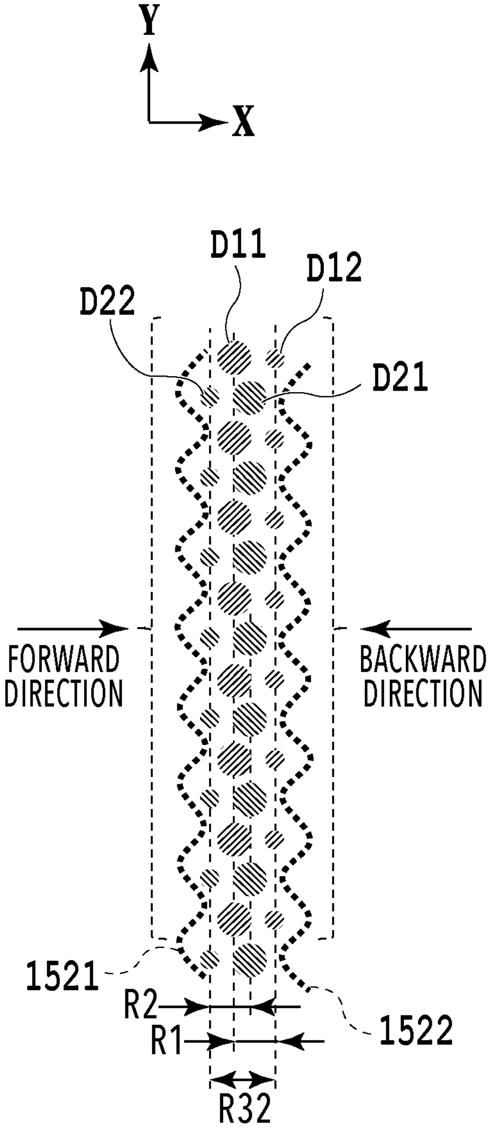

FIGS. 15A and 15B are diagrams showing landing images of main droplets and satellites in the case where registration adjustment values are offset. However, FIGS. 15A and 15B are assumed to show cases where printing is made while a registration adjustment value is offset to reduce misalignment of a rule line at the time of one-pass printing as compared with the landing images shown in FIGS. 14A and 14B. Sign R32 represents a distance between sub dots D12 and sub dots D22 in the X direction. That is, the sign R32 can also be said to represent the size of the fine line in the width direction.

FIG. 15A shows a landing image in the case where printing is made in a one-pass bidirectional manner. Sub dots D12 are slightly shifted to the upstream side in the backward direction relative to main dots D21, and sub dots D22 are slightly shifted to the upstream side in the forward direction relative to main dots D11. However, since droplets of the main dots D11 and D21 are larger than droplets of the sub dots D12 and D22, and the distance R32 is shorter than the distance R3 of FIG. 14A, misalignment of the rule line is less likely to be noticed in FIG. 15A than in the case of FIG. 14A. Note that signs 1511 and 1512 represent edge portions of the fine line.

FIG. 15B shows a landing image in the case where printing is made in a multi-pass bidirectional manner. Main dots D21 are printed between main dots D11 and sub dots D12 in the X direction, and main dots D11 are printed between main dots D21 and sub dots D22 in the X direction, so that the distance R32 of FIG. 15B is shorter than the distance R3 of FIG. 14B. Since the sub dots D12 and D22 smaller than the main dots D11 and D21 are located alternately on the downstream side in the forward direction and on the downstream side in the backward direction in the Y direction, so that the rule line is visually recognized to be blurred. Note that signs 1521 and 1522 represent edge portions of the fine line.

Figure 16A:
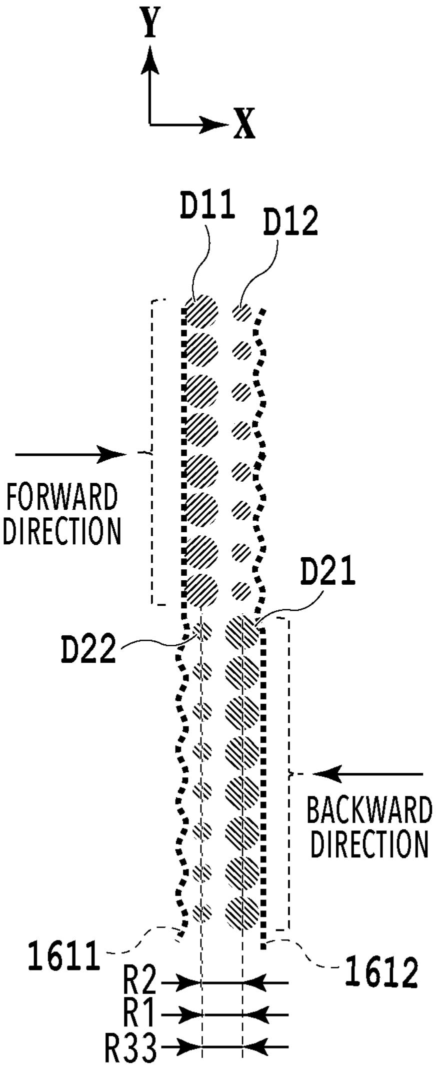
FIGS. 16A and 16B are diagrams showing landing images in the case where registration adjustment values are offset.
Figure 16B:
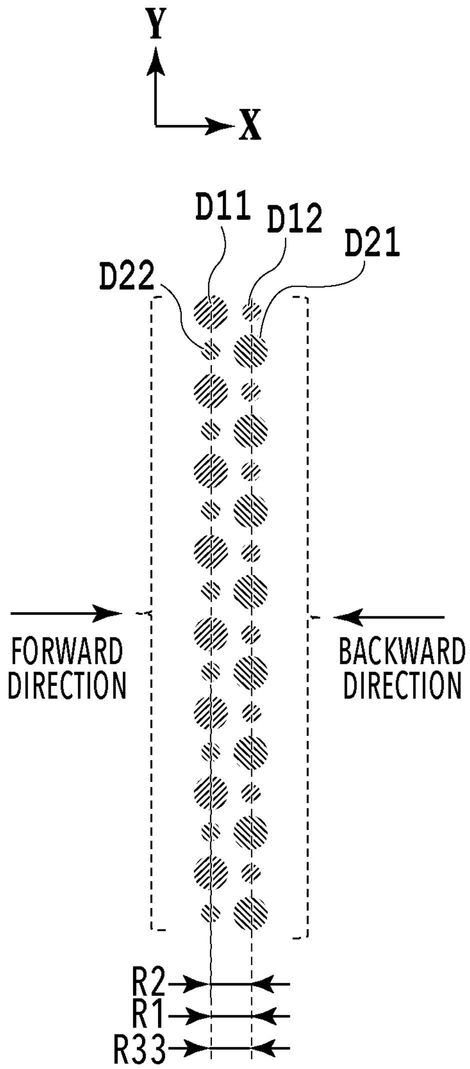

FIGS. 16A and 16B are diagrams showing landing images of main droplets and satellites in the case where registration adjustment values are offset. However, FIGS. 16A and 16B are assumed to show a case where printing is made while a registration adjustment value is offset to reduce misalignment of a rule line at the time of multi-pass printing as compared with the landing images shown in FIGS. 14A and 14B. In FIGS. 16A and 16B, sign R33 represents a distance between sub dots D12 and sub dots D22. That is, the sign R33 can also be said to represent the size of the rule line in the width direction.

FIG. 16A shows a landing image in the case where printing is made in a one-pass bidirectional manner. The sub dots D12 are not shifted in the scanning direction relative to the main dots D21, and the sub dots D22 are not shifted in the scanning direction relative to the main dots D11. However, since droplets of the main dots D11 and D21 are larger than droplets of the sub dots D12 and D22, and the distance R33 is longer than the distance R32 of FIG. 15A, there is a case where the rule line is visually recognized to be misaligned in FIG. 16A as compared with the case of FIG. 15A. Note that signs 1611 and 1612 represent edge portions of the fine line.

FIG. 16B shows a landing image in the case where printing is made in a multi-pass bidirectional manner. The sub dots D12 are not shifted in the scanning direction relative to the main dots D21 and are adjacent to the main dots D21, and the main dots D21 and the sub dots D12 are printed alternately in the Y direction. In addition, the sub dots D22 are not shifted in the scanning direction relative to the main dots D11 and are adjacent to the main dots D11, and the main dots D11 and the sub dots D22 are printed alternately in the Y direction. Hence, the rule line is visually recognized not to be blurred in FIG. 16B as compared with the cases of FIG. 14B and FIG. 15B.

In view of the above-described circumstances, in the present embodiment, in the case of printing an image for which importance is placed on the rule line quality in a one-pass bidirectional manner, the registration adjustment value is adjusted to be able to obtain dot arrangement as shown in FIG. 15A. On the other hand, in the case of printing an image for which importance is placed on the rule line quality in a multi-pass bidirectional manner, the registration adjustment value is adjusted to be able to obtain dot arrangement as shown in FIG. 16B. That is, according to the present embodiment, the ejection timing of the printing head is adjusted such that the distance in the scanning direction between main dots printed in forward scanning and main dots printed in backward scanning becomes smaller in the case of printing in a one-pass bidirectional manner than in the case of printing in a multi-pass bidirectional manner. This can also be said to adjust the ejection timing of the printing head such that a dot region containing landing positions of main droplets and sub droplets in the case where printing scan is made in the backward direction coincides with a dot region containing landing positions of main droplets and sub droplets in the case where printing scans is made in the forward direction. This makes it possible to print an image with a favorable rule line quality in both one-pass bidirectional printing and multi-pass bidirectional printing.

Subsequently, landing images in the case where halftone images are printed with the respective registration adjustment values and offset amounts will be described.

Figure 17B:
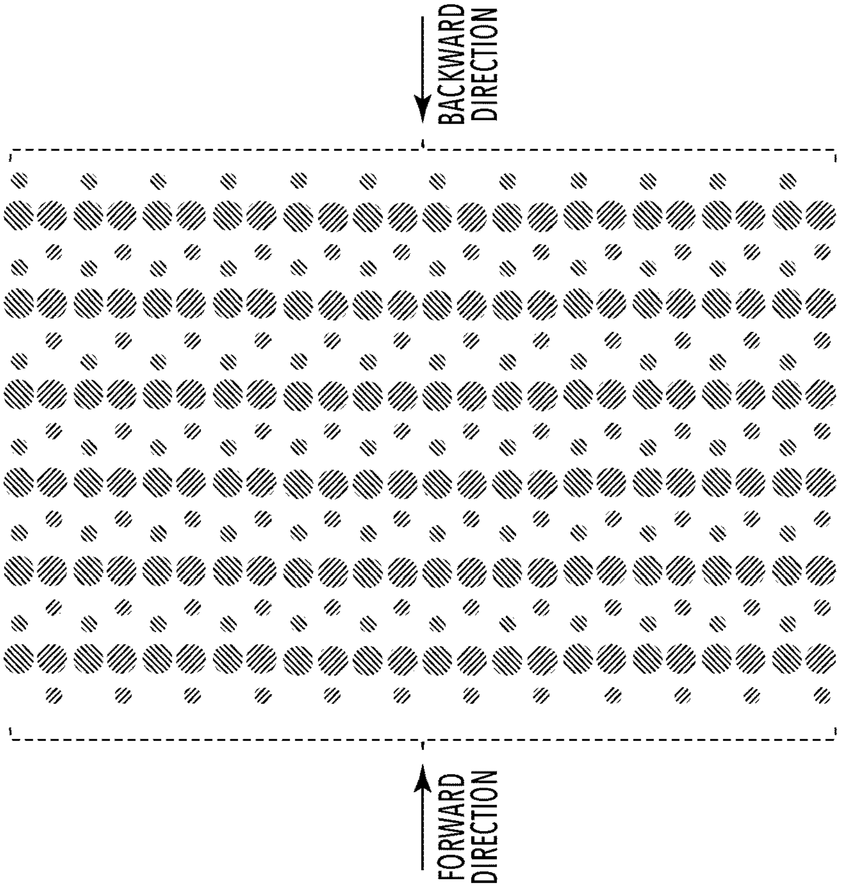
FIGS. 17A and 17B are diagrams showing landing images of main dots and sub dots in the case where halftone images are printed.
Figure 17A:
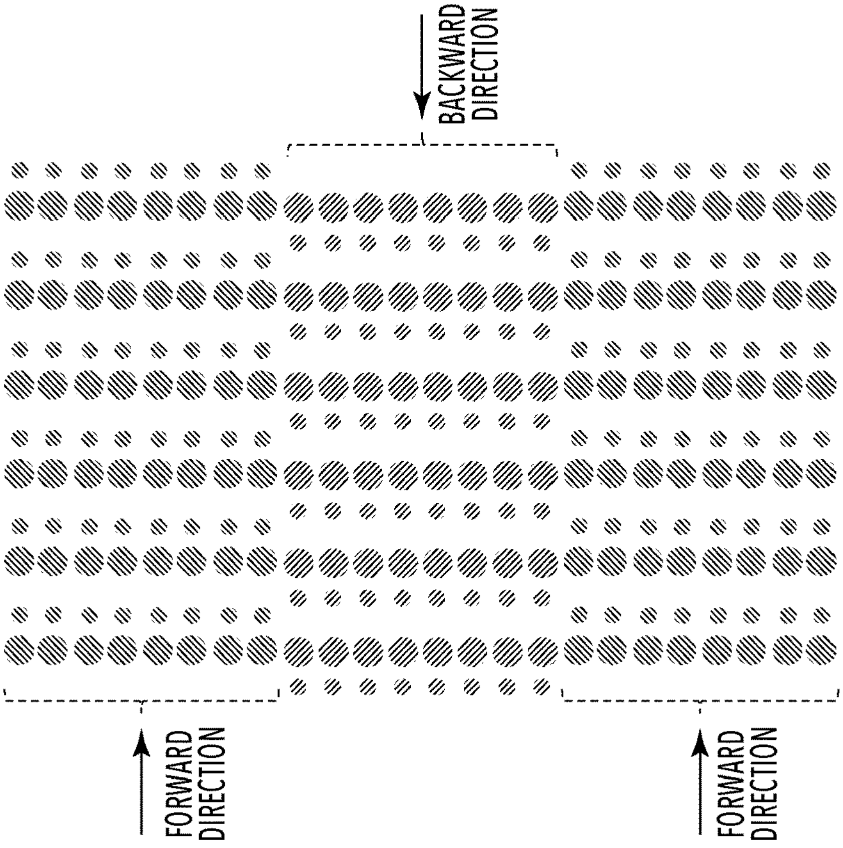

FIGS. 17A and 17B are diagrams showing landing images of main dots and sub dots in the case where halftone images are printed. However, it is assumed that FIGS. 17A and 17B show cases where printing is made with the registration adjustment values shown in FIGS. 14A and 14B. FIG. 17A shows a landing image in the case where printing is made in a one-pass bidirectional manner. FIG. 17B shows a landing image in the case where printing is made in a multi-pass bidirectional manner.

As shown in FIGS. 17A and 17B, it is confirmed that main dots larger than sub dots land at positions that are uniform in the forward and backward directions.

Figure 18B:
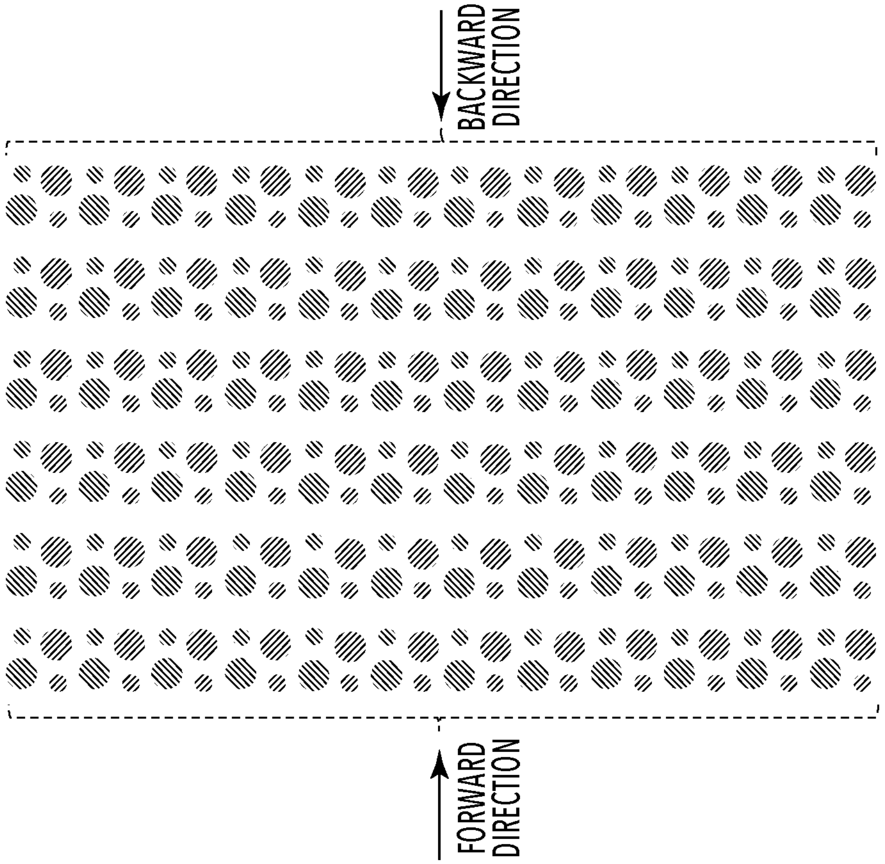
FIGS. 18A and 18B are diagrams showing landing images of main dots and sub dots in the case where halftone images are printed.
Figure 18A:
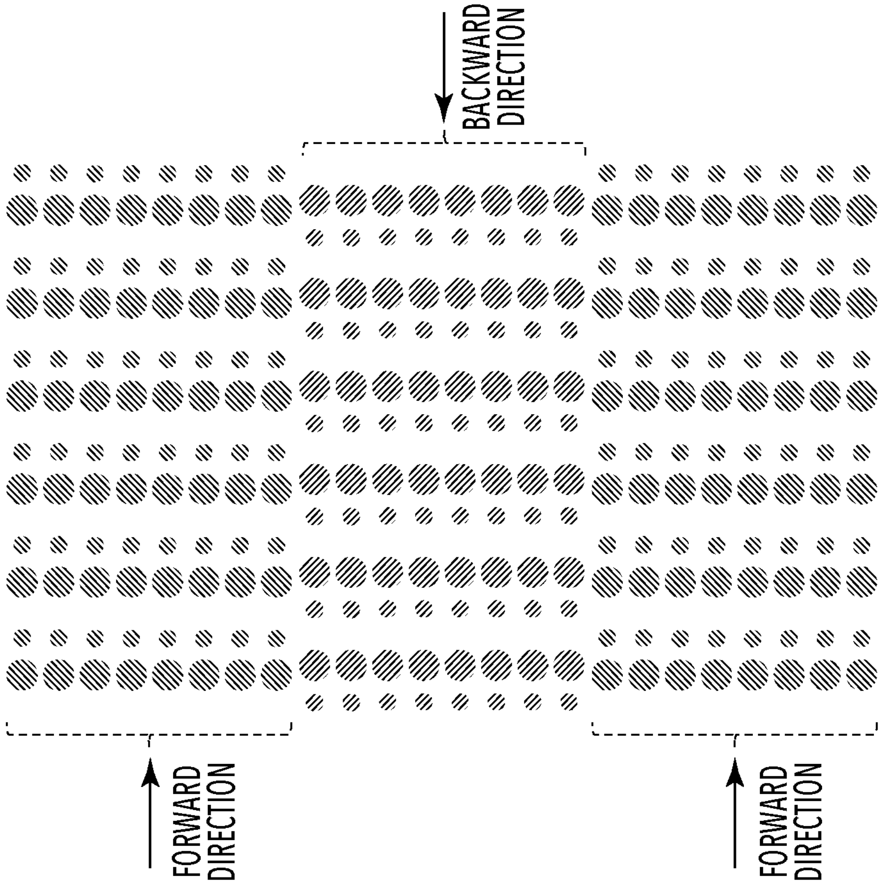

FIGS. 18A and 18B are diagrams showing landing images of main dots and sub dots in the case where halftone images are printed. However, it is assumed that FIGS. 18A and 18B show cases where printing is made while being made offset relative to the registration adjustment values. FIG. 18A shows a landing image in the case where printing is made in one pass by using the offset amount shown in FIGS. 15A and 15B. FIG. 18B shows a landing image in the case where printing is made in multi pass by using the offset amount shown in FIGS. 16A and 16B.

In FIG. 18A, it is confirmed that main dots land at positions non-uniform in the forward and backward directions, so that graininess is lowered as compared with the case of FIG. 17A. In FIG. 18B, it is confirmed that main dots land at positions non-uniform in the forward and backward directions, so that graininess is lowered as compared with the case of FIG. 17B.

In view of the above-described circumstances, in the present embodiment, in the case of an image for which importance is placed on a reduction in the graininess, the registration adjustment value is adjusted to be able to obtain dot arrangement as shown in FIGS. 17A and 17B both in the case of printing in a one-pass bidirectional manner and in the case of printing in a multi-pass bidirectional. Specifically, a registration adjustment value obtained by the method described by using FIGS. 9A and 9B as well as FIG. 10 is used as the registration adjustment value as it is.

Next, a method for offsetting a registration adjustment value in accordance with a printing mode will be described.

FIGS. 19A to 19C are diagrams showing offset tables. However, the tables are assumed to be tables for setting correction values that are offset amounts for main droplet adjustment values of such registration adjustment that align the positions of main dots at the time of bidirectional printing. The head height corresponds to G1 indicating a distance from the nozzle orifices of the printing head 5 to the printing medium P.

FIG. 19A is a diagram showing offset amounts in accordance with head heights and carriage (CR) speeds of TBL1 for each ink of CMYK. TBL1 is a table for modes of printing images for which importance is placed on the linear quality in a one-pass bidirectional mode. According to this, for example, the offset amount of the K ink is “1” in the case where the head height is up to 1.0 mm and the CR speed is 10 inch/sec, and is “5” in the case where the head height exceeds 1.0 mm and the CR speed is 80 inch/sec.

Since the distance between main dots and sub dots is larger as the head height is higher and the CR speed is faster, the offset amount is larger.

FIG. 19B is a diagram showing offset amounts in accordance with head heights and carriage (CR) speeds of TBL2 for each ink of CMYK. TBL2 is a table for modes of printing images for which importance is placed on the linear quality in a multi-pass bidirectional manner. According to this, for example, the offset amount of the K ink is “1” in the case where the head height is up to 1.0 mm and the CR speed is 10 inch/see, and is “13” in the case where the head height exceeds 1.5 mm and the CR speed is 80 inch/sec.

Since the distance between main dots and sub dots is larger as the head height is higher and the CR speed is faster, the offset amount is larger than the printing mode 1 (a printing mode in which printing is made in one pass).

FIG. 19C is a diagram showing offset amounts in accordance with head heights and carriage (CR) speeds of TBL3 for each ink of CMYK. TBL3 is a table for modes of printing images for which importance is placed on the graininess. In FIG. 19C, the offset amount is “0” for all conditions.

FIG. 20 is a table showing correspondence between image qualities to be prioritized (prioritized image qualities) and the numbers of printing passes and offset TBL numbers. Referring to FIG. 20 makes it possible to determine the offset TBL number from the prioritized image quality and the number of printing passes.

TBL1 is an offset TBL number which is referred to in the case where the prioritized image quality is a rule line quality and in the case of one-pass where the number of printing passes is one. TBL2 is an offset TBL number which is referred to in the case where the prioritized image quality is a rule line quality and in the case of multi-pass where the number of printing passes is two or more. TBL3 is an offset TBL number which is referred to in the case where the prioritized image quality is a reduction in graininess.

That is, in the case where the number of printing passes is “one-pass” and the prioritized image quality is “rule line quality”, TBL1 is referred to. In the case where the number of printing passes is “multi-pass” and the prioritized image quality is “rule line quality”, TBL2 is referred to. In the case where the number of printing passes is “one-pass” and the prioritized image quality is “reduction in graininess”, TBL3 is referred to. In the case where the number of printing passes is “multi-pass” and the prioritized image quality is “reduction in graininess”, TBL3 is referred to.

Figure 21:
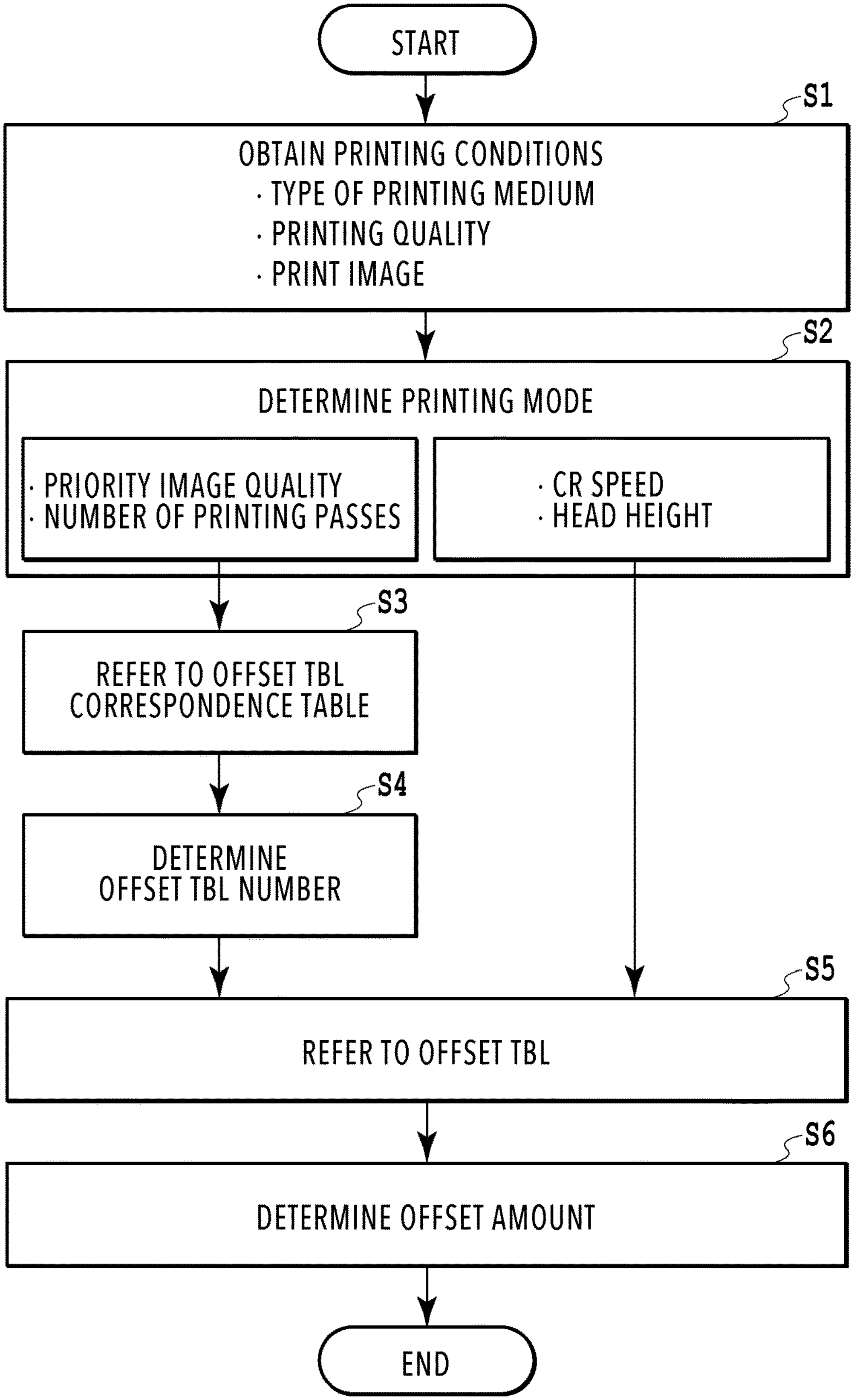
FIG. 21 is a flowchart showing a flow of processing of determining an offset amount.

FIG. 21 is a flowchart showing a flow of processing of determining an offset amount at the time of printing. The control of this flowchart is executed by the CPU 20_a_ executing a program stored in the ROM 20_c_.

First, in S1, the printing apparatus analyzes a printing instruction received from the host apparatus 100 to obtain printing conditions including the type of a printing medium, the printing quality, the print image, and the like. Subsequently, in S2, the printing apparatus determines the printing mode such as the prioritized image quality, the number of printing passes, the CR speed, and the head height based on the printing conditions obtained in the processing of S1. The processing of S2 can also be said to set one printing mode from among a plurality of modes including the above-mentioned first printing mode and second printing mode. In the prioritized image quality, an image quality relating to the rule line quality or an image quality relating to the graininess is determined.

Here, in S3, the printing apparatus refers to the offset TBL correspondence table shown in FIG. 20. Then, in S4, the printing apparatus determines an offset TBL number based on the printing mode determined in S2. That is, the printing apparatus determines the offset TBL number based on the prioritized image quality to be recorded and the number of printing passes which are determined in S2. For example, in the case where the rule line quality and one-pass are determined, the printing apparatus determines TBL1 as the offset TBL number. In the case where the rule line quality and multi-pass are determined, the printing apparatus determines TBL2 as the offset TBL number. In the case where the graininess is determined, the printing apparatus determines TBL3 as the offset TBL number irrespective of one-pass or multi-pass.

In S5, the printing apparatus refers to TBL corresponding to the offset TBL number determined in S4. Then, in S6, the printing apparatus determines an offset amount based on TBL referred to in S5, and the CR speed and head height determined in S2. For example, in the case where the offset TBL number determined in S4 is TBL1 and the head height and the CR speed of K ink determined in S2 are 1.5 mm and 80 inch/see, respectively, the printing apparatus determines 5 as the offset amount. In the case where the offset TBL number determined in S4 is TBL2 and the head height and the CR speed of K ink determined in S2 are 1.5 mm and 80 inch/sec, respectively, the printing apparatus determines 9 as the offset amount. In the case where the offset TBL number determined in S4 is TBL3 and the head height and CR speed of K ink determined in S2 are 1.5 mm and 80 inch/sec, respectively, the printing apparatus determines 0 as the offset amount.

Note that the number of offset TBLs and the offset amount are not limited to this. Each registration adjustment value may be held instead of offset amounts corresponding to printing conditions. The offset amounts do not have to be specified in offset TBLs in advance but may be calculated at the time of printing. The prioritized image quality may be set or determined at the time of printing.

As described above, the present embodiment makes it possible to improve a linear quality and graininess by offsetting a bidirectional registration adjustment value in accordance with the number of printing passes and prioritized image quality.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The technique of the present disclosure makes it possible to print an image with an improved linear quality irrespective of a printing mode in the case of conducting bidirectional printing in a serial-type printing apparatus.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-026442, filed Feb. 22, 2023, which is hereby incorporated by reference herein in its entirety.

What is claimed is:

1. A printing apparatus comprising:

a scanning unit configured to cause a printing unit in which plurality of printing elements for ejecting ink are arrayed to reciprocate and scan in (1) a first direction intersecting an array direction of the plurality of printing elements and (2) a second direction opposite to the first direction;

a setting unit configured to set one printing mode from among a plurality of printing modes including (1) a first printing mode in which printing of an image on a predetermined region on a printing medium is completed by one scan of the printing unit in the first direction or the second direction and (2) a second printing mode in which printing of an image on the predetermined region is completed by a plurality of scans of the printing unit including scans in both of the first direction and the second direction;

a control unit configured to control an ejection timing of the ink in a case where the printing unit scans in the first direction and an ejection timing of the ink in a case where the printing unit scans in the second direction, and to control an ejection timing of the printing unit such that a first distance becomes shorter than a second distance, wherein the first distance is a distance in the scanning direction between (1) a landing position at which an ink droplet lands on the printing medium in the case where the printing unit scans in the first direction and (2) a landing position at which an ink droplet lands on the printing medium in the case where the printing unit scans in the second direction, in the first printing mode, wherein the second distance is a distance in the scanning direction between (1) a landing position at which an ink droplet lands on the printing medium in a case where the printing unit scans in the first direction and (2) a landing position at which an ink droplet lands on the printing medium in a case where the printing unit scans in the second direction, in the second printing mode, wherein in a case of printing an image for which importance is placed on a reduction in graininess, (1) the setting unit sets a third printing mode, and (2) the control unit controls the ejection timing of the printing unit such that a third distance becomes shorter than the first distance, wherein the third distance is a distance in the scanning direction between (1) a landing position at which an ink droplet lands on the printing medium in a case where the printing unit scans in the first direction and (2) a landing position at which an ink droplet lands on the printing medium in a case where the printing unit scans in the second direction, in the third printing mode, wherein the printing apparatus further comprises a storage unit configured to store a registration adjustment value for adjusting the ejection timing in the case where the printing unit scans in the second direction relative to the ejection timing in the case where the printing unit scans in the first direction, wherein in a case where the setting unit sets the third printing mode, the control unit adjusts the ejection timing of the printing unit by using the registration adjustment value stored in the storage unit, and wherein in a case where the setting unit sets the first printing mode or the second printing mode, the control unit adjusts the ejection timing of the printing unit by using a registration adjustment value obtained by correcting the registration adjustment value.

2. The printing apparatus according to claim 1, wherein in one ejecting operation of the plurality of printing elements, a main droplet as the ink droplet and a sub droplet smaller than the main droplet are ejected.

3. The printing apparatus according to claim 1, wherein in the third printing mode, the control unit controls the ejection timing of the printing unit such that the landing position of the ink droplet in the case where the printing unit scans in the first direction and the landing position of the ink droplet in the case where the printing unit scans in the second direction coincide with each other in the scanning direction.

4. The printing apparatus according to claim 1, wherein the control unit corrects the registration adjustment value by using a correction value stored in a table prepared for each of the first printing mode and the second printing mode.

5. The printing apparatus according to claim 4, wherein the table holds a correction value corresponding to at least one printing condition among conditions of an ink color ejected from the printing unit, a scan speed of the printing unit, and a distance from a face of the printing unit in which nozzles are formed to the printing medium.

6. The printing apparatus according to claim 5, wherein the ink color includes cyan, magenta, yellow, and black.

7. The printing apparatus according to claim 1, wherein in one ejecting operation of the plurality of printing elements, a main droplet as the ink droplet and a sub droplet smaller than the main droplet are ejected, wherein the control unit controls the ejection timing of the printing unit such that a first position is located between a second position and a third position, wherein the first position is a landing position of the main droplet in the case where the printing unit scans in the second direction, and wherein the second position and the third position are a landing position of the main droplet and a landing position of the sub droplet in the case where the printing unit scans in the first direction, respectively, by using a registration adjustment value obtained by correcting the registration adjustment value, in the first printing mode.

8. The printing apparatus according to claim 1, wherein in one ejecting operation of the plurality of printing elements, a main droplet as the ink droplet and a sub droplet smaller than the main droplet are ejected, wherein the control unit controls the ejection timing of the printing unit such that a first region coincides with a second region, wherein the first region is a dot region including landing positions of the main droplet and the sub droplet in the case where the printing unit scans in the second direction, and wherein the second region is a dot region including landing positions of the main droplet and the sub droplet in the case where the printing unit scans in the first direction, by using a registration adjustment value obtained by correcting the registration adjustment value, in the second printing mode.

9. A printing method comprising:

causing a printing unit in which a plurality of printing elements for ejecting ink are arrayed to reciprocate and scan in a first direction intersecting an array direction of the plurality of printing elements and a second direction opposite to the first direction;

setting one printing mode from among a plurality of printing modes including (1) a first printing mode in which printing of an image on a predetermined region on a printing medium is completed by one scan of the printing unit in the first direction or the second direction and (2) a second printing mode in which printing of an image on the predetermined region is completed by a plurality of scans of the printing unit including scans in both of the first direction and the second direction;

controlling an ejection timing of the ink in the case where the printing unit scans in the first direction and an ejection timing of the ink in a case where the printing unit scans in the second direction; and controlling an ejection timing of the printing unit such that a first distance becomes shorter than a second distance, wherein the first distance is a distance in the scanning direction between (1) a landing position at which an ink droplet lands on the printing medium in the case where the printing unit scans in the first direction and (2) a landing position at which an ink droplet lands on the printing medium in the case where the printing unit scans in the second direction, in the first printing mode, wherein the second distance is a distance in the scanning direction between (1) a landing position at which an ink droplet lands on the printing medium in the case where the printing unit scans in the first direction and (2) a landing position at which an ink droplet lands on the printing medium in the case where the printing unit scans in the second direction, in the second printing mode, wherein in a case of printing an image for which importance is placed on a reduction in graininess, (1) the setting sets a third printing mode, and (2) the controlling the ejection timing of the printing unit controls the ejection timing of the printing unit such that a third distance becomes shorter than the first distance, wherein the third distance is a distance in the scanning direction between (1) a landing position at which an ink droplet lands on the printing medium in a case where the printing unit scans in the first direction and (2) a landing position at which an ink droplet lands on the printing medium in a case where the printing unit scans in the second direction, in the third printing mode, wherein the printing method further comprises storing in a storage unit a registration adjustment value for adjusting the ejection timing in the case where the printing unit scans in the second direction relative to the ejection timing in the case where the printing unit scans in the first direction, wherein in a case where the setting sets the third printing mode, the controlling the ejection timing of the printing unit adjusts the ejection timing of the printing unit by using the registration adjustment value stored in the storage unit, and wherein in a case where the setting sets the first printing mode or the second printing mode, the controlling the ejection timing of the printing unit adjusts the ejection timing of the printing unit by using a registration adjustment value obtained by correcting the registration adjustment value.

10. A non-transitory computer-readable storage medium storing a program which causes a computer to perform a printing method, the printing method comprising:

causing a printing unit in which a plurality of printing elements for ejecting ink are arrayed to reciprocate and scan in a first direction intersecting an array direction of the plurality of printing elements and a second direction opposite to the first direction;

setting one printing mode from among a plurality of printing modes including (1) a first printing mode in which printing of an image on a predetermined region on a printing medium is completed by one scan of the printing unit in the first direction or the second direction and (2) a second printing mode in which printing of an image on the predetermined region is completed by a plurality of scans of the printing unit including scans in both of the first direction and the second direction;

controlling an ejection timing of the ink in the case where the printing unit scans in the first direction and an ejection timing of the ink in a case where the printing unit scans in the second direction; and controlling an ejection timing of the printing unit such that a first distance becomes shorter than a second distance, wherein the first distance is a distance in the scanning direction between (1) a landing position at which an ink droplet lands on the printing medium in the case where the printing unit scans in the first direction and (2) a landing position at which an ink droplet lands on the printing medium in the case where the printing unit scans in the second direction, in the first printing mode, wherein the second distance is a distance in the scanning direction between (1) a landing position at which an ink droplet lands on the printing medium in the case where the printing unit scans in the first direction and (2) a landing position at which an ink droplet lands on the printing medium in the case where the printing unit scans in the second direction, in the second printing mode, wherein in a case of printing an image for which importance is placed on a reduction in graininess, (1) the setting sets a third printing mode, and (2) the controlling the ejection timing of the printing unit controls the ejection timing of the printing unit such that a third distance becomes shorter than the first distance, wherein the third distance is a distance in the scanning direction between (1) a landing position at which an ink droplet lands on the printing medium in a case where the printing unit scans in the first direction and (2) a landing position at which an ink droplet lands on the printing medium in a case where the printing unit scans in the second direction, in the third printing mode, wherein the printing method further comprises storing in a storage unit a registration adjustment value for adjusting the ejection timing in the case where the printing unit scans in the second direction relative to the ejection timing in the case where the printing unit scans in the first direction, wherein in a case where the setting sets the third printing mode, the controlling the ejection timing of the printing unit adjusts the ejection timing of the printing unit by using the registration adjustment value stored in the storage unit, and wherein in a case where the setting sets the first printing mode or the second printing mode, the controlling the ejection timing of the printing unit adjusts the ejection timing of the printing unit by using a registration adjustment value obtained by correcting the registration adjustment value.

* * * * *